United States Patent
Link et al.

(10) Patent No.: US 9,537,731 B2
(45) Date of Patent: Jan. 3, 2017

(54) MANAGEMENT TECHNIQUES FOR NON-TRADITIONAL NETWORK AND INFORMATION SYSTEM TOPOLOGIES

(75) Inventors: David F. Link, Falls Church, VA (US); Christopher G. Cordray, Chantilly, VA (US); Richard M. Chart, Falls Church, VA (US); Karl Ginter, Beltsville, MD (US)

(73) Assignee: ScienceLogic, Inc., Reston, VA (US)

( * ) Notice: Subject to any disclaimer, the term of this patent is extended or adjusted under 35 U.S.C. 154(b) by 2135 days.

(21) Appl. No.: 12/051,125

(22) Filed: Mar. 19, 2008

(65) Prior Publication Data

US 2008/0228908 A1    Sep. 18, 2008

Related U.S. Application Data

(63) Continuation-in-part of application No. 11/175,407, filed on Jul. 7, 2005.

(Continued)

(51) Int. Cl.
*G06F 15/173* (2006.01)
*H04L 12/24* (2006.01)

(52) U.S. Cl.
CPC .......... *H04L 41/5058* (2013.01); *H04L 41/12* (2013.01); *H04L 41/026* (2013.01); *H04L 41/0213* (2013.01); *H04L 41/0293* (2013.01); *H04L 41/046* (2013.01); *H04L 41/082* (2013.01); *H04L 41/0816* (2013.01); *H04L 41/0826* (2013.01); *H04L 41/0843* (2013.01); *H04L 41/5074* (2013.01)

(58) Field of Classification Search
USPC .................................................. 709/223–226
See application file for complete search history.

(56) References Cited

U.S. PATENT DOCUMENTS 5,712,960 A * 1/1998 Chiopris et al. ................ 706/61
5,974,474 A * 10/1999 Furner et al. ..................... 710/8

(Continued)

OTHER PUBLICATIONS

BNET, Unique Auto-discovery and Auto-tuning Functions from Q1 Labs Make Ease-of-Use and Deployment Simple and Intuitive Throughout the Enterprise, Sep. 26, 2006.

(Continued)

*Primary Examiner* — Hua Fan
(74) *Attorney, Agent, or Firm* — Nixon & Vanderhye P.C.

(57) ABSTRACT

Systems, software, and methods for managing traditional (i.e., TCP/IP-based), non-traditional, and traditional-non-traditional hybrid networks of connected electronic devices are described. In one example, network management policy and network management applications are downloaded automatically upon detection and identification of a new device, application or service on a network. In another example, information related to at least one aspect of the network is obtained by a network management device through connection to a non-TCP/IP network, or by way of a gateway device or application, at least one applicable management policy is identified, and the identified policy is used to manage at least one aspect of the network's operation. In another example, devices, applications or services presenting various behaviors under various scenarios are evaluated and placed under management.

20 Claims, 4 Drawing Sheets

Related U.S. Application Data

(60) Provisional application No. 60/895,590, filed on Mar. 19, 2007, provisional application No. 60/585,638, filed on Jul. 7, 2004, provisional application No. 60/676,588, filed on Apr. 29, 2005.

(56) References Cited

U.S. PATENT DOCUMENTS

| | | | |
|---|---|---|---|
| 6,029,141 A * | 2/2000 | Bezos et al. | 705/27.1 |
| 6,081,518 A * | 6/2000 | Bowman-Amuah | 370/352 |
| 6,088,659 A * | 7/2000 | Kelley et al. | 702/62 |
| 6,104,868 A | 8/2000 | Peters et al. | |
| 6,182,136 B1 * | 1/2001 | Ramanathan et al. | 709/224 |
| 6,212,560 B1 * | 4/2001 | Fairchild | 709/223 |
| 6,226,788 B1 * | 5/2001 | Schoening et al. | 717/107 |
| 6,343,320 B1 * | 1/2002 | Fairchild et al. | 709/224 |
| 6,393,474 B1 * | 5/2002 | Eichert et al. | 709/223 |
| 6,418,468 B1 | 7/2002 | Ahlstrom et al. | |
| 6,477,568 B2 * | 11/2002 | Borrett et al. | 709/223 |
| 6,490,617 B1 * | 12/2002 | Hemphill et al. | 709/223 |
| 6,560,656 B1 | 5/2003 | O'Sullivan et al. | |
| 6,615,218 B2 * | 9/2003 | Mandal et al. | |
| 6,691,161 B1 | 2/2004 | Cook et al. | |
| 6,708,187 B1 | 3/2004 | Shanumgam et al. | |
| 6,728,378 B2 * | 4/2004 | Garib | 380/259 |
| 6,788,315 B1 | 9/2004 | Kekic | |
| 6,795,846 B1 | 9/2004 | Merriam | |
| 6,851,118 B1 | 2/2005 | Ismael et al. | |
| 6,865,737 B1 * | 3/2005 | Lucas et al. | 717/178 |
| 6,965,932 B1 | 11/2005 | Rajaram et al. | |
| 6,981,266 B1 | 12/2005 | An et al. | |
| 6,983,317 B1 * | 1/2006 | Bishop et al. | 709/223 |
| 6,990,660 B2 * | 1/2006 | Moshir et al. | 717/171 |
| 7,013,462 B2 | 3/2006 | Zara et al. | |
| 7,028,307 B2 | 4/2006 | Thiele | |
| 7,069,343 B2 * | 6/2006 | Goringe et al. | 709/249 |
| 7,080,092 B2 * | 7/2006 | Upton | |
| 7,130,870 B1 | 10/2006 | Pecina et al. | |
| 7,136,851 B2 | 11/2006 | Ma et al. | |
| 7,143,156 B2 | 11/2006 | Menzies et al. | |
| 7,150,044 B2 * | 12/2006 | Hoefelmeyer et al. | 726/23 |
| 7,197,561 B1 * | 3/2007 | Lovy et al. | 709/224 |
| 7,395,324 B1 * | 7/2008 | Murphy et al. | 709/223 |
| 7,478,097 B2 | 1/2009 | Emeis et al. | |
| 7,490,175 B2 | 2/2009 | Rosenbloom et al. | |
| 7,512,674 B1 * | 3/2009 | Jain et al. | 709/223 |
| 7,516,201 B2 * | 4/2009 | Kovacs et al. | 709/223 |
| 7,523,184 B2 * | 4/2009 | Kortright | 709/223 |
| 7,565,416 B1 | 7/2009 | Shafer et al. | |
| 7,603,710 B2 * | 10/2009 | Harvey et al. | 726/23 |
| 2001/0003191 A1 * | 6/2001 | Kovacs et al. | 709/226 |
| 2002/0019862 A1 * | 2/2002 | Borrett et al. | 709/221 |
| 2002/0021465 A1 * | 2/2002 | Moore et al. | 359/125 |
| 2002/0109879 A1 * | 8/2002 | Wing So | 359/118 |
| 2002/0116485 A1 * | 8/2002 | Black et al. | 709/223 |
| 2002/0188643 A1 * | 12/2002 | Kennedy | 709/1 |
| 2003/0005091 A1 * | 1/2003 | Ullmann et al. | 709/220 |
| 2003/0006911 A1 * | 1/2003 | Smith et al. | 340/988 |
| 2003/0023711 A1 | 1/2003 | Parmar et al. | |
| 2003/0046427 A1 * | 3/2003 | Goringe et al. | 709/242 |
| 2003/0195957 A1 * | 10/2003 | Banginwar | 709/223 |
| 2003/0212767 A1 | 11/2003 | Yang-Huffman et al. | |
| 2003/0229501 A1 * | 12/2003 | Copeland et al. | 705/1 |
| 2004/0088386 A1 * | 5/2004 | Aggarwal | 709/220 |
| 2004/0088404 A1 * | 5/2004 | Aggarwal | 709/224 |
| 2004/0088405 A1 * | 5/2004 | Aggarwal | 709/224 |
| 2004/0103193 A1 * | 5/2004 | Pandya et al. | 709/224 |
| 2004/0143628 A1 * | 7/2004 | Bradford et al. | 709/203 |
| 2004/0148372 A1 * | 7/2004 | Campbell | 709/223 |
| 2004/0163008 A1 | 8/2004 | Kim | |
| 2004/0181446 A1 * | 9/2004 | Vance | 705/11 |
| 2004/0181664 A1 * | 9/2004 | Hoefelmeyer et al. | 713/157 |
| 2004/0193329 A1 * | 9/2004 | Ransom et al. | 700/286 |
| 2004/0210654 A1 * | 10/2004 | Hrastar | 709/224 |
| 2004/0221022 A1 * | 11/2004 | Gracyk | 709/220 |
| 2005/0073522 A1 * | 4/2005 | Aholainen et al. | 345/440 |
| 2005/0076343 A1 | 4/2005 | Kammhuber | |
| 2005/0102383 A1 * | 5/2005 | Sutler | 709/223 |
| 2005/0229154 A1 * | 10/2005 | Hiew et al. | 717/110 |
| 2005/0239448 A1 * | 10/2005 | Bayne | 455/414.3 |
| 2005/0256850 A1 | 11/2005 | Ma et al. | |
| 2006/0092861 A1 * | 5/2006 | Corday et al. | 370/256 |
| 2006/0287911 A1 * | 12/2006 | Laberge et al. | 705/11 |
| 2007/0226365 A1 * | 9/2007 | Hildreth et al. | 709/231 |
| 2010/0094981 A1 * | 4/2010 | Cordray et al. | 709/222 |
| 2011/0035491 A1 * | 2/2011 | Gelvin et al. | 709/224 |

OTHER PUBLICATIONS

Geekgirl, Setting up a Home Network, 2002 [online; archived on Feb. 15, 2002; retrieved on Sep. 24, 2008]. Retrieved from the Internet <URL:http://web.archive.org/web/20020215180857/http://www.geekgirls.com/windowsxp_home_network.htm>.

International Search Report and Written Opinion of the International Searching Authority issued in corresponding PCT application (Oct. 26, 2006).

AventNet, "AdventNet OpUtils Manual".

ManageEngine, ManageEngine OpUtil 3. 2005. [Online]. Available: http://manageengine.advantnet.com/products/oputils/index.html.

T. Charrot and D. Brassington, "Collecting Data from Disparate Intrusion Detection System Sensors," QuietiQ, Aug. 2002.

Cisco, "Overview of the CNS Notification Engine".

Cisco, "Cisco Networking Services Notification Engine Comprehensive Guide".

Cisco, "Using and Administering the CNS Notification Engine".

Farm9. Harvester Project. 2005 [Online]. Available: http://farm9.org/Harvester.

Farm9.org, "Harvester API Guide and Reference: farm9.org," 2002.

Monitor, "IPMontior 7.5 Specifications," 2005.

PerformanceIT. ProIT is built on a powerful, fully distributed high scalable arch featuring six unique components. 2005 [Online]. Available: http://www.performanceit.com/.

PerformanceIT. Performance IT Feature List. 2005. [Online]. Available: http://www.performanceit.com/feature_list.html.

PerformanceIT—IT monitoring solutions and services. ProIT Enterprise comes in three models (SE), (LE) and (VLE). 2005 [Online]. Available: http://www.performanceit.com/ed.

Set Machine. Welcome to the Set Machine Tutorial! Apr. 2002. [Online]. available: http://www.setmachine.com/howto.html.

Set Machine. E-mail parsing + database generation. Apr. 2002 [Online]. Available: http://www.setmachine.com/email/html.

Sun.com. Jini Network Technology, White Papers and Other Documents, "Jini technology architectural overview." 1999. [Online]. Available: http://www.sun.com/jini/whitepaper.

Sun.com. Jini Network Technolo. "Overview." 2005. [Online] Available: http://www.sun.com/jini/overview/.

Tavve, "EProbe 2.1.," Tavve. 2002.

ScienceLogic Named InfoWorld 2013 Technology of the Year Award Winner (2013).

Review: The best network monitoring system on earth ScienceLogic EM7 brings ultraflexible, ultrascalable, carriergrade network monitoring to the enterprise (InfoWorld 2013).

InfoWorld's 2013 Technology of the Year Award winners The InfoWorld Test Center picks the best hardware, software, development tools, and cloud services of the year (InfoWorld 2013).

* cited by examiner

MANAGEMENT TECHNIQUES FOR NON-TRADITIONAL NETWORK AND INFORMATION SYSTEM TOPOLOGIES

CROSS REFERENCE TO RELATED U.S. PATENT APPLICATIONS

The present application claims priority under 35 U.S.C. §119(e) to provisional U.S. Patent Application Ser. No. 60/895,590 filed Mar. 19, 2007, which is incorporated herein by reference in its entirety and for all purposes. This application also is a continuation-in-part of co-pending U.S. patent application Ser. No. 11/175,407 filed on Jul. 7, 2005, the entire disclosure of which is incorporated herein by reference for all purposes.

FIELD

The exemplary, illustrative, technology herein relates to systems, software, and methods for managing the operation of networks comprised of various and disparate electronic devices. More particularly, the exemplary, illustrative, technology herein provides systems, software, and methods for automatically configuring and enabling management software and systems for managing the operation of networks comprised of various and disparate electronic devices with non-traditionally managed networks and data sources. Furthermore, the technology herein is used to automatically integrate information collected during the managing of the operation of networks comprised of various and disparate electronic devices, including those devices connected to non-traditional networks. The technology herein has applications in the areas of computer science, electronics, electronic commerce, and production automation.

BACKGROUND

Computer network technology has experienced phenomenal growth over the past two decades, from the esoteric experimental defense-related projects known to only a handful of electronics and military specialists in the 1960s and 1970s, to the epicenter of the so-called dot-com stock market boom of the late 1990s. Today, tens, perhaps hundreds, of millions of people over the globe rely on computer networks for their jobs, education, and entertainment. In the industrialized world, access to computer networks appears to be almost ubiquitous. Examples include building control networks for managing a building's internal environment, networks of sensors monitoring air quality, factory floor automation, and combined communications systems comprising previously disparate systems. SCADA systems provide process supervisory control and data collection capabilities used to operate most industrial systems today. Most industrial processes and machines are also controlled by SCADA systems using industrial controllers such as PLCs. In recent years, PLCs have become better integrated with TCP/IP-based networks, but often still require custom applications for control and management. Other industrial controllers have not migrated to TCP/IP due to various technical and other considerations. Thus, in general, the term "network" or "computer network" includes both "traditional networks," i.e., those using TCP/IP or SNMP protocols, and "non-traditional" networks that do not have either an SNMP (or other TCP/IP management stack), an SNMP OID-based management data hierarchy, or other aspects required for "traditional" network management functions to operate as understood by those having ordinary skill in the art. Typically non-traditional networks use protocols such as CANbus and IEEE 488. (The differentiation of traditional and non-traditional computer networks will be apparent to those persons having ordinary skill in the art.) As used herein, "network" or "computer network" includes both traditional and non-traditional networks as just defined.

Not only has the presence of computer networks expanded but the complexity of these electronic webs has increased as well. Today, a system administrator must simultaneous deal with a myriad of different devices, manufacturers, network types, and protocols, as well as support the ad-hoc attachment and removal of devices from the network as portable wireless devices automatically connect and disconnect from the network infrastructure. Devices must be able to communicate properly across the network without interfering with each other. In particular, administrators must be able to identify warnings and troubleshoot abnormal behavior on the network and network-attached systems long before risk to network integrity or availability occurs. Non-traditional networks (e.g. CANbus, IEEE 488) and the devices connected to them are often used in real-time control of SCADA systems, increasing the urgency that these networks and devices be effectively managed. Traditional management systems, i.e., management systems that are used to manage traditional computer networks, typically do not integrate with non-traditional networks and traditional management paradigms are generally not extensible to support non-traditional networks and devices.

For various reasons, including providing flexible security arrangements and the effects of changes implemented in device upgrades or revisions over time, some devices can present a plurality of "personalities" to a network. For example, two devices, both of the same manufacture and type, can have differing capabilities or behaviors due to differences in revision level or the firmware loaded on the device. Identical devices can also can present different capabilities or behaviors depending on how a device is accessed. For example, if a particular device is accessed with a first set of Authentication and Authorization (A&A) materials, it provides one set of capabilities (e.g. functions A, B, and C) or provides certain information (e.g. data values 1, 2, and 3). When the same device is accessed with a second set of A&A materials, it provides a second set of capabilities (e.g. functions X, Y, and Z), and provides a second, different, information set (e.g. data values 10, 20, and 30). If the device is accessed with a third set of A&A materials, it can provide yet another set of capabilities (e.g. functions A, B, C, X, Y, and Z), and can provide yet another information set (e.g. 1, 2, 3, 10, 20, and 30). Current network management systems cannot cope well with devices that exhibit these types of highly context-specific behavior. Network management systems that can deal with such devices are needed, because devices presenting this type of behavior are used on some networks, and due to increasing emphasis on security, and a need for flexibility in implementing security, the number of such devices is likely to increase over time.

Six Sigma is one current methodology for implementing manufacturing process improvements. Six Sigma is based upon Statistical Process Control (SPC) on the premise that improving the processes that make products will produce higher quality and yields. Virtually every large organization has, or requires their subcontractors to have, a quality initiative that focuses on repeatable results. Many organizations focus on quality initiatives to reduce scrap, increase throughput, and improve the bottom line. Automation has been of help in these areas. Six Sigma is a highly structured methodology summarized by the acronym "DMAIC," which represents Define, Measure, Analyze, Improve, and Control. Core to Six Sigma methodologies is the ability to define, measure, and control processes using statistical methods. There is a need to apply DMAIC principles to the SCADA and SPC network of devices to gain the benefits of Six Sigma in this area.

SPC software systems automate parts of these quality initiatives. SPC software systems monitor processes for variation and notify appropriate personnel of variations from statistical norms. SPC software is used to detect changes in process results before these changes create scrapped product. Coordinate Measuring Machines (CMMs) are examples of SPC devices—CMMs are measurement devices that are integrated with SPC systems, and provide accurate measurements of products in various stages of the processes. SPC systems are often limited to support of one or two devices or device types, limiting the types of data and the frequency at which information is collected from devices.

SPC software systems have typically required expensive retooling of control systems. In some instances, these initiatives require expensive controllers and expose SPC and SCADA devices to traffic and interference from the enterprise network. New legislative requirements require operators of SPC and SCADA systems to manage these networks and protect the SPC and SCADA systems from interference from other sources.

SCADA networks and devices include network-connected devices that provide data to SPC systems. A Remote Terminal Unit (RTU) connects to physical equipment and provides real time status and sense information for the physical equipment. Physical equipment includes switches, valves, gauges, and meters of various types. RTUs are connected using Serial, Ethernet, and other networking schemes such as CAN.

Initial forays into SCADA and SPC device management using traditional management products produced complex architectures that required significant custom programming and complex applications to interact with the controlled entities. Each entity required customized programming to collect and manage data collected from these entities. SCADA and SPC systems have traditionally existed outside traditional management paradigms, and have duplicated information and processes already automated by other systems. SCADA and SPC applications, sometimes called factory floor or manufacturing execution systems (MES):

Require specialized expertise to install and configure the data collection and management software and additional applications.

Require duplicative applications to monitor the data collection equipment and to collect and store information from it.

Require an expertise-based configuration of the software and applications for data collection and SPC within an enterprise, including:

Complex collection of vendor-specific applications to monitor disparate hardware and software, Monitoring a limited number of attributes per SCADA or SPC system during process control efforts, Monitoring and collecting a variable number of attributes during data collection, the attributes and their measurements varying based upon business factors such as the part being operated upon, Require extensive custom programming to monitor applications, Require extensive custom programming to collect and store information from SCADA and SPC devices and systems.

SCADA and SPC systems traditionally do not monitor application, system, or network performance and/or QoS, Presume the network infrastructure is always available.

In addition, the day-to-day operation of these types of network-based SCADA and SPC products:

Require skilled support staff to maintain the solution, including adding and removing devices and device configurations as the SCADA and SPC device and network topology changes.

Require the use of external (redundant) applications to manage the resulting workload (e.g. notifications, trouble tickets).

Require the use of external systems to manage enterprise critical infrastructure.

Require additional controller components to make SCADA and SPC products compatible with TCP/IP-based networks.

Are not integrated with network and system security products such as Intrusion Detection Systems (IDSs), audit trails, and other log management mechanisms.

Are not integrated with the enterprise's policies, including security, configuration management, and other IT-based policies.

Produce a high false positive rate, in which non-existent or transient failures are reported and must be acted upon.

SCADA and SPC management products also require extensive pre-configuration for devices and require substantial additional setup as new devices are added or changed on a SCADA or SPC network. The additional configuration workload limits the usefulness of ad-hoc or intermittently connected networks of SCADA and SPC devices, requiring 100% uptime of connections between the SCADA and SPC devices and their management software. In these days of staffing reductions, the ongoing management costs of network-based SCADA and SPC management systems require substantial improvements in productivity to be justifiable.

Additionally, current management systems are not integrated with enterprise databases and are not able to manage networks (both traditional and non-traditional) using information contained in these enterprise databases. Additionally, the management of business parameters stored within management databases is supported using the management device. In addition, the management device provides integration with third party network and system security products such as IDSs, audit trails, and log management mechanisms. Many systems also do not integrate easily with enterprise management policies, including security, configuration management, operating parameters, and other IT-based policies, nor do they integrate with other corporate information systems that provide additional operating information. In addition, current management systems suffer from high false failure reporting rates, wasting manager time and resources.

Finally, there is a need for management systems that provide filtered interfaces of combinations of corporate, network performance, and other information in a variety of information distribution means and formats that are integrated with various applications and reporting methods.

Thus, there is an immediate need for management systems for traditional, non-traditional and networks combining traditional and non-traditional networks, that are more robust, and simpler to install, configure, and maintain. The exemplary, illustrative, technology herein meets these and other similar needs.

SUMMARY OF THE TECHNOLOGY HEREIN

The exemplary, illustrative, technology herein provides management systems, methods, and software that significantly reduce the complexities and limitations of current management systems, thereby providing greater service and value to managers and users.

In a first aspect, an exemplary illustrative non-limiting implementation provides a method for managing devices on a computer network. In one exemplary illustrative non-limiting implementation, the method comprises discovering at least one device, application, or service on the network; identifying such discovered device, application, or service, or combination thereof; instantiating a first dynamic application to perform further discovery of such discovered device, application, or service, or combination thereof; receiving discovery information from said first dynamic application; and instantiating a second dynamic application in response to discovery information derived from said first dynamic application. In other exemplary non-limiting implementations, the method further includes evaluating said discovery information. In still other exemplary implementations, the method includes instantiating said second dynamic application in response to said evaluation. In still other exemplary illustrative non-limiting implementations, the method includes instantiating at least a third dynamic application in response to discovery information received from said second dynamic application; and instantiating subsequent dynamic applications in response to discovery information received from a previously instantiated dynamic application until a determination is made that substantially all discoverable aspects of said device have been discovered.

In still other exemplary illustrative non-limiting implementations, a discovered device, application or service is a database server; and in more particular exemplary non-limiting implementations, the schema of said database is determined from said discovery information. In more specific exemplary implementations, substantially all aspects of said database that require monitoring or control are determined. Yet more specific exemplary implementations include, instantiating at least one additional dynamic application to determine whether said server is in communication with another device, application of service and instantiating at least one dynamic application to examine said other device, application or service.

In yet other exemplary illustrative non-limiting implementations, at least one of said first or second dynamic applications is configured to identify a fingerprint of type of said device. In some exemplary implementations, the fingerprint is based on a firmware load or a revision level. In other exemplary illustrative non-limiting implementations, a discovery application configured to investigate said device type is instantiated; and, still more particularly the method includes including determining the specific capabilities of said device and instantiating a dynamic application configured to manage said device. In some exemplary implementations, the fingerprint information is used to select a dynamic application from a set of possible dynamic applications.

Still other exemplary illustrative non-limiting implementations include storing A&A materials, and more particularly A&A materials that enable access to a database.

In still other exemplary implementations, variations among said discovery results are identified; and, more particularly the method of the exemplary illustrative non-limiting implementation includes using said variations to at least partly categorize or classify said device or both. In some exemplary illustrative non-limiting implementations, the variations are used to determine at least one device "personality". In still other exemplary illustrative non-limiting implementations, the device has at least two personalities, and each "personality" of said device is treated as a different point of management by a management device.

In another aspect, the exemplary illustrative non-limiting implementation provides a computer-readable medium containing computer-readable program code devices that are configured to cause a computer to implement the above described methods.

In still another aspect, the exemplary illustrative non-limiting implementation includes systems for implement the above-described methods under computer control.

BRIEF DESCRIPTION OF THE DRAWINGS

These and other features and advantages will be better and more completely understood by referring to the following detailed description of exemplary non-limiting illustrative implementations in conjunction with the drawings of which.

DETAILED DESCRIPTION OF EXEMPLARY, NON-LIMITING IMPLEMENTATIONS

Definitions

Figure 1:
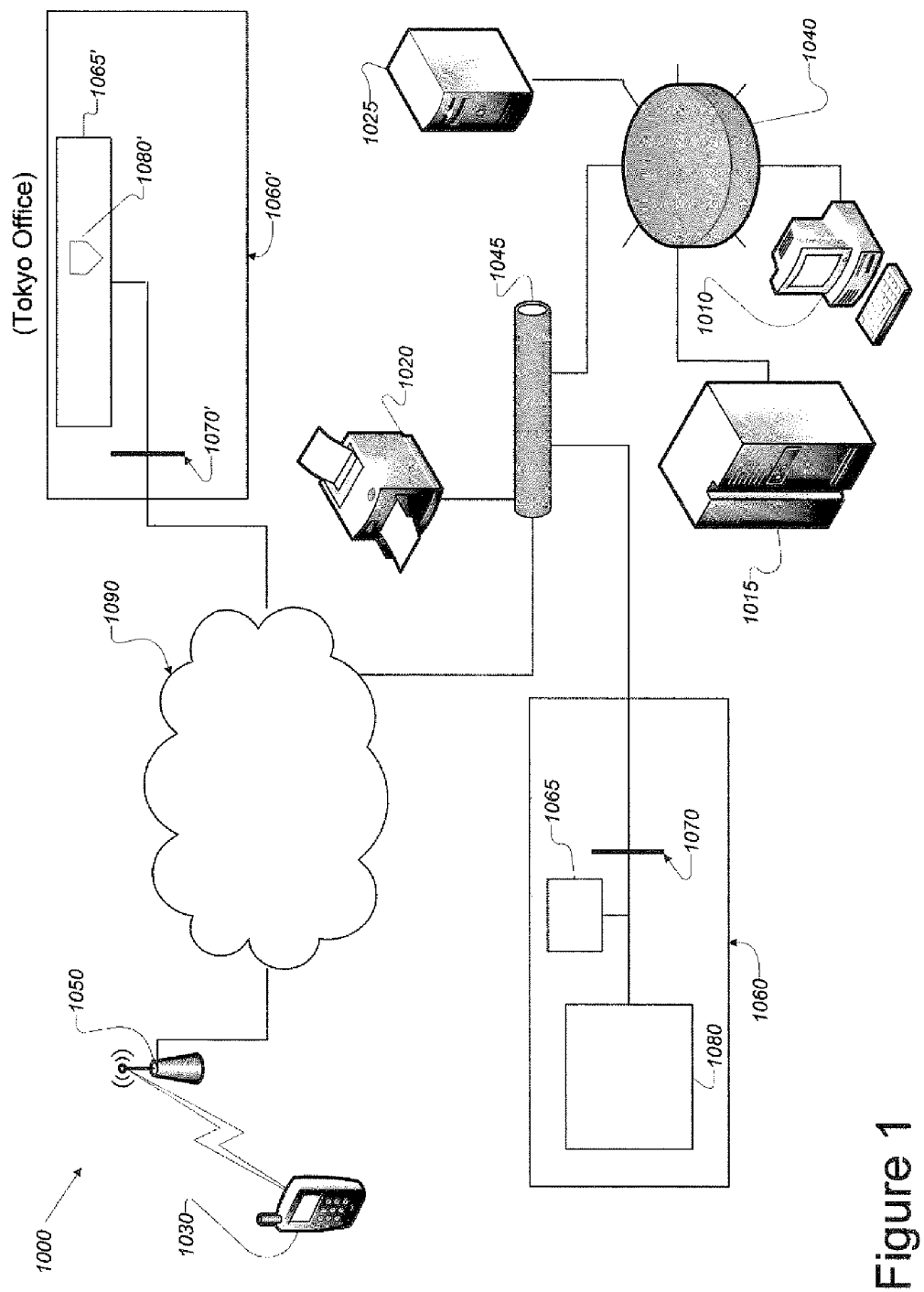
FIG. 1 depicts a schematic diagram of a network to be managed in accordance with the exemplary illustrative technology herein.

The following terms and abbreviations used herein have the definitions provided below, unless otherwise noted.

| Term | Definition |
| --- | --- |
| CAN | Controller Area Network |
| FieldBus | A collective term for SCADA networks that connect RTUs. |
| Network or Computer Network | Configuration of devices and software that are in mutual communication and can exchange information, including data and instructions (includes wired and wireless). As used herein, the terms "network" and "computer network" include both traditional and non-traditional networks. |
| PLC | Programmable Logic Controller |
| RTU | Remote Terminal Unit |
| SPC | Statistical Process Control |
| SCADA | Supervisory Control and Data Acquisition |
| DeviceNet | A FieldBus networking approach over CAN |
| CANOpen | A FieldBus networking approach over CAN |
| ModBus | A FieldBus networking approach over serial or TCP/IP connection (ModBus or ModBus/TCP respectively). |
| Traditional network | A network using TCP/IP or SNMP protocols or both. |
| Non-Traditional Network | A networks using a protocols such as CANbus and IEEE 488 and that does not have either an SNMP (or other TCP/IP management stack), an SNMP OID-based management data hierarchy, or other aspects required for "traditional" network management functions to operate as understood by those having ordinary skill in the art. |

Overview

The technology illustrated herein addresses the deficiencies in the prior art by providing, in one aspect, methods, software, apparatus, and systems that automate the introduction and management of devices on non-traditional networks that link various electronic devices, services, and applications when the devices on the non-traditional network are not connected to a TCP/IP network. In another aspect, the technology described herein addresses the integration of business processes with the introduction and ongoing management of devices on networks linking various electronic devices, services, and applications, and particularly addresses the integration of information stored within enterprise databases to the management process.

One exemplary non-limiting implementation of the technology illustrated herein comprises a management device. The management device is an appliance-based system used to automate business processes surrounding the initial and ongoing functioning and management of SCADA and SPC networks, Remote Terminal Units (RTUs), other devices, and application, and to efficiently permit information and control flow between such networks and devices and traditional enterprise networks and systems. The management device was designed to address the deficiencies of traditional SCADA and SPC management products in areas such as DMAIC support, by integrating device discovery, monitoring, control and reporting with enterprise business systems such as order tracking, quality assurance, cost estimating and billing, as well as simplifying more traditional tasks, such as periodic checking of device calibration and function or locating problem devices when resolving errors. Numerous features of the management device architecture are unique, and these features are further combined with integrated common approaches in a network appliance using a common data storage mechanism. This places the management device significantly ahead of traditional SCADA and SPC management products in terms of efficiency, effectiveness and flexibility.

The management device is targeted for users of ad-hoc, disparate, partially integrated networks and systems that require an integrated point of management. These include traditional networks, SCADA and SPC control, and other systems. Unlike traditional SCADA and SPC network and system management tools, the management device is designed to work with ad-hoc networks of disparate systems over varying network types. This extends its usefulness from high-end managed networks to numerous other environments, and is designed to operate cross-network to include traditional TCP/IP networking elements. The management device is also designed to support non-continuously connected networks, which further extends its reach into alternative spectrum and mesh networks. For example, devices using Bluetooth, IrDA or other short-range connection technologies are often mobile wireless devices that connect and join networks while in range, and lose connectivity when the device is moved away again. This type of intermittent connection to various points in a fixed network is problematic for some network management systems, but is dealt with by the management device through its detection and self-configuration capabilities.

The management device is easy to deploy. It permits users to install the management device by unpacking the management device appliance and attaching it to their SCADA or SPC network. In some cases, an interface card must be installed to support attachment to non-Ethernet-based networks such as DeviceNet, CANopen, ModBus, VLXI, or IEEE 488. The management device's automatic device and service discovery (auto-discovery) and self-configuration features permit the management device appliance to reconfigure itself and begin collecting, aggregating, and reporting information about the network, systems, and running services to enterprise system managers.

The auto-discovery characteristics of the management device provide for low ongoing maintenance costs. New devices and applications are identified from their SCADA network traffic fingerprint (much in the way spyware is currently identified on PCs), and dynamic applications are instantiated to manage these newly discovered devices and applications. These capabilities are configurable using policy templates. The control afforded by policy templates permits the management device's capabilities to be deployed securely and efficiently, providing a significant advantage over traditional management applications.

An additional advantage of the auto-discovery approaches used by the management device is that management device management becomes effective without the time and cost of deploying customized agents to each of the managed devices. A management device uses native protocols and information already made visible to support the discovery and management processes.

Auto-discovery is not limited to traditional attributes of discovered elements. For example, an auto-discovery application discovers a gauge at network address 4 upon a previously unknown IEEE 488 network. Upon receiving the notification of discovery, the auto-discovery application then invokes a "gauge management" dynamic application to further interrogate the gauge and begin management of the gauge.

An advantage to this approach is that many devices, applications, and services are auto-discovered using the techniques described herein. Auto-discovery mechanisms use expert system techniques to examine existing network protocols and interfaces, and mine the information presented therein to build topologic maps and management information. These techniques permit the management device to be deployed without additional software agents and their associated deployment and management costs. For example, an auto-discovery process may not only discover databases, but also can discover aspects of the schema for the database, as well as any additional meta-data about the schema. The meta-data, schema, and database information are presented as part of an integrated user interface that integrates information from database(s), network devices (both status and performance) and non-traditional network devices.

Another aspect of auto-discovery is that it can be an iterative process, where a device is discovered and identified, and a dynamic application instantiated to do further discovery about aspects of the device. These further discoveries can result in a different, or additional, dynamic application being instantiated to deal with these new aspects, or to investigate them still further until all aspects of the device are discovered and placed under management. For example, this iterative auto-discovery can result in a computer workstation being discovered and identified as a Sun workstation running the Solaris operating system. This discovery results in a Sun-Solaris discovery dynamic application being instantiated that accesses the Sun workstation and identifies it as, among other things, being a host for a MySQL database server. This discovery results in a MySQL discovery application being instantiated to investigate the MySQL database schema to determine if any aspects of the database require monitoring or control, as specified by applicable templates. Other dynamic applications are instantiated to investigate other aspects of the Sun workstation, such as the devices it is in communication with. This can result in additional discoveries about the network and the devices connected to it, which results in additional discovery applications being instantiated. This process of iterative auto-discovery is sometimes referred to as "dynamic discovery."

Iterative auto-discovery is particularly useful in cases where a device of a given manufacture and type can present differing "fingerprints" based on such things as firmware loads or revision levels. For example, an initial auto-discovery can identify the device manufacturer and type, and instantiate a new discovery application that is specific to that particular device type. The more specific discovery application is designed to investigate that particular device type, and determine the specific capabilities it presents and instantiate an appropriate dynamic application to manage it. In some cases this results in a selection of one dynamic application from a set of possible dynamic applications, and in other cases results in a particular dynamic application being instantiated with varying parameters that cause it to configure itself to manage the particular variant of the device type that was discovered. For example, a manufacturer of a Widget Model 1 device may have two different revision levels of that device. The first revision level supports SNMP access to three OID items, while the second revision level supports SNMP access to six OID items. Discovery of the Widget Model 1 device results in the instantiating of a Widget Model 1 discovery dynamic application. This dynamic application attempts to access all six OID items on the discovered device. If this succeeds, the device is of the second revision level. If it fails, but an attempt to access three OID items succeeds, the device is of the first revision level. Once this information has been determined, one of two possible Widget Model 1 device monitoring dynamic applications is instantiated, or a common Widget Model 1 dynamic application is instantiated with a parameter indicating which OID set is supported by the given device. Alternatively, a more generic SNMP monitoring application is instantiated and parameterized with information on the OIDs to be monitored in the given device. Those of skill in the art will readily see other possible methods of dealing with management of the device, once its specific nature has been identified by an iterative auto-discovery process. Such auto-discovery processes are repeated at intervals so as to discover and place under management any recently connected devices, or to recognize and adapt to changes in existing devices, such as firmware upgrades, additional network interfaces, or new services.

In order to perform some kinds of auto-discovery, Authentication and Authorization ("A&A") materials can be required. For example, if a database server is discovered, and its schema must be determined, access to the database server is required so as to issue the commands required to identify schema elements, such as databases, tables, and fields. Many database servers require usernames, passwords, or other A&A materials before they permit such commands to be processed. The management device provides a method of securely storing A&A materials for performing actions requiring them. The method of storing A&A materials permits full access through the UI for those with proper authorization, while blocking access to those without proper authorization. Those with some, but less than full access authorization still can be permitted to use the A&A materials, such as to request discovery on a particular device, or address range on a network, etc., without being able to access the actual A&A materials. This capability permits invocation of A&A materials for management device use without knowledge of them that can be applied in other ways, thus permitting more flexibility in implementing security without restricting the ability of the management device to discover network devices, servers, and other systems under direction of users with less than full access to credential information. Examples of A&A materials include, without limitation, SNMP Community String and authentication information for SNMP V1, V2, and V3, SQL database usernames and passwords, XML, SOAP, AXL SOAP, or other connections that optionally can require authorization information to be used by the management device to obtain access to managed device information.

By permitting multiple sets of A&A materials for a given device, the management device also can perform auto-discovery on devices that present different "personalities" based on the A&A materials used to access them. Auto-discovery is performed with a plurality of A&A materials, and the varying results determined and used to categorize and classify the device using template-based device descriptions, and can result in an appropriate dynamic application, or applications, being instantiated to manage the device. Each "personality" of a device is treated as a different point of management by the management device, effectively causing the device to appear to be a plurality of separate devices based on the A&A materials used to access it. Alternatively, the personality resulting in the greatest capability for managing the device is selected as the point of management and the others ignored. In yet another alternative implementation, the device is treated as a single point of management with a plurality of behaviors, each associated with a different access credential.

Thus, some exemplary illustrative non-limiting implementations of the technology illustrated herein include systems, software and apparatus configured to perform the above-described iterative auto-discovery. In more specific non-limiting exemplary implementations, the iterative auto-discovery includes discovering at least one device, application, or service; identifying such discovered device, application, or service (or combination thereof); and instantiating a first dynamic application to perform further discovery of such discovered device, application, or service (or combination thereof). A second dynamic application is instantiated in response to discovery information derived from the first dynamic application, based upon an evaluation. Subsequent dynamic applications (third, fourth, etc.) are instantiated in response to dynamic information received from the previous dynamic application. In some exemplary implementations just described, the iterative procedure continues until a determination is made that substantially all discoverable aspects of the device have been discovered and, where policies and templates require it, placed under management. The details of the implementation of these operations will be understood by persons having ordinary skill in the art.

In other exemplary illustrative non-limiting implementations of the iterative discovery aspect of the exemplary illustrative non-limiting implementation, the information gathered and analyzed by the successive dynamic applications can indicate that a device, application or service is a database server. In more specific exemplary implementations, the information gathered and analyzed by the successive dynamic applications indicates that a device, application or service is a database server, and further provides the schema of the database or databases served. In still more detailed implementations, the information gathered and analyzed is sufficient to determine any aspects of the database that require monitoring or control, for example, as specified by applicable templates or policies. In still other more specific exemplary non-limiting implementations, additional dynamic applications are instantiated to investigate other aspects of the database server, such as, for example whether the server is in communication with other devices, applications or services. And in yet more specific exemplary illustrative non-limiting implementations, still more dynamic applications are instantiated to examine such other devices, applications or services.

In still other exemplary illustrative non-limiting implementations of the iterative discovery aspect of the exemplary illustrative non-limiting implementation, additional dynamic applications are instantiated to investigate other aspects of devices, applications and services discovered, such as, for example whether a device, application or service is in communication with other devices, applications or services. And in yet more specific exemplary implementations, still more dynamic applications are instantiated to examine such other devices, applications or services.

In some exemplary illustrative non-limiting implementations of the various foregoing iterative discovery exemplary implementations just described, the dynamic applications are configured to identify one or more "fingerprints" identifying a device, application or service. In some exemplary implementations, such fingerprints are based on firmware loads or revision levels. In some exemplary implementations, other aspects of device, application or service behavior comprise fingerprints for a device, application or service, such as initial data returned when a connection is formed, data returned in response to particular queries made, the types of devices, applications or servers the device, application or service in question is in communication with, or other aspects as will be clear to those with skill in the art. The more specific discovery application is designed to investigate that particular device type, and determine the specific capabilities it presents and, when policy or template data requires it, instantiate an appropriate dynamic application to manage it. In some exemplary implementations, the fingerprint information is used to select one dynamic application from a set of possible dynamic applications; and in other implementations, the fingerprint information will cause instantiation of a particular dynamic application having varying parameters that cause the dynamic application to configure itself to manage a discovered device.

In another aspect, the exemplary illustrative non-limiting implementation includes securely storing and providing A&A materials as defined above to enable access to a database. In some exemplary illustrative non-limiting implementations, full access to the A&A materials is provided for those with authorization, but blocked to those without authorization. In other exemplary implementations, limited access is provided for use of the A&A materials to those with less than full access authorization, without permitting them to access the actual A&A materials. In still other exemplary illustrative non-limiting implementations, auto-discovery is performed with a plurality of A&A materials to obtain two or more sets of results. In some of those exemplary implementations, the variations among the results are determined. In still other exemplary non-limiting implementations, the variations are used to at least partly categorize or classify the device (or both), and, in more specific non-limiting implementations, to provide at least one device "personality". In still other exemplary illustrative non-limiting implementation, each "personality" of a device is treated as a different point of management by the management device; and the management device is configured to manage a device having at least two personalities as a plurality of separate devices based on the A&A materials used to access it. In other non-limiting implementations, the device is managed using the personality by which the management device obtains the greatest management capability; in more specific exemplary implementations, the other personalities are ignored. In yet other exemplary implementations, a device having two or more personalities is managed as a single point of management with a plurality of behaviors, each associated with a different access credential. In still other non-limiting implementations, such categorizing and classifying are done using template-based device descriptions. In yet other exemplary implementations, one or more dynamic applications are instantiated to manage the device according to such templates.

In some exemplary implementations, the A&A materials for various devices and services that can be discovered are stored and managed in an Asset Manager. In some exemplary illustrative non-limiting implementations, the storage of the A&A materials is performed using "secure" techniques, such as storing hashed password values and/or encrypting the A&A materials within the Asset Manager. In other exemplary implementations, no security techniques are used to protect the A&A materials. In still more specific exemplary illustrative non-limiting implementations, the A&A materials and the associations to specific devices, services, device types, service types and/or other entities, as well as access restrictions concerning user access for use, modification, viewing or deletion of particular A&A materials, are maintained by the Asset Manager, and accessed through the User Interface. In still other exemplary implementations, the A&A materials are provided to dynamic applications, as required, in the form of templates and/or application parameters.

The integration of trouble ticket, alerting/notification, and log management applications within the management device consolidate the processing of these items within an enterprise, and permits a unified response approach to be taken. Failures of underlying networks, systems, and databases are managed using the same tools as the SCADA and SPC process and data-out-of-specification issues. In addition, because many SCADA and SPC issues have underlying network application root-causes, the combined management of these issues saves time and costs in problem resolution.

As used herein, a "network" is a configuration of devices and software that are in mutual communication and can exchange information, including data and instructions. Such communication is accomplished either by the presence of a direct physical connection between devices (i.e., wired communication) or indirectly by electromagnetic communication (i.e., wireless communication), using whatever protocols are extant between the two devices. A network can include arbitrary numbers and types of devices, systems, and applications, which, in some exemplary, illustrative, non-limiting implementations, function in accordance with established policies so that the term "network" includes managed networks. Examples of devices, systems, and applications that can comprise a network consistent with the technology described herein include, without limitation:

Traditional network-based devices such as routers, switches, and hubs;

Traditional network-based computing assets, such as servers and workstations;

Traditional network links, including dedicated and dial-up connections and related devices (e.g., modems, concentrators, and the like);

Industrial devices, such as those controlled by programmable logic controllers (PLCs), embedded computers, or other industrial controllers; when connected on TCP/IP network and managed using a network management protocol such as SNMP.

Consumer appliances (e.g., cell phones, audio/visual equipment, home lighting controllers).

A "non-traditional network" is a configuration of devices and software that are in mutual communication and can exchange information, including data and instructions using a non-IP-based protocol. Such communication is accomplished either by the presence of a direct physical connection between devices (i.e., wired communication) or indirectly by electromagnetic communication (i.e., wireless communication), using whatever protocols are extant between the two devices. A network can include arbitrary numbers and types of devices, systems, and applications, which, in some exemplary, illustrative, non-limiting implementations, function in accordance with established policies and controls over the devices, how they can connect, and the types of information that is collected and managed for each device. Examples of devices, systems, and applications that can comprise a non-traditional network consistent with the technology described herein include, without limitation:

- Dedicated building control components, such as thermostats, furnace and chiller controls
- Ladder logic controllers
- Scales and gauges
- Meters and sensors, including various types of embedded sensors and arrays of sensors, including RFID sensors
- Industrial device controllers, such as PLCs, embedded computers, Coordinate Measuring Machines (CMMs), and similar devices when connected on non-TCP/IP based networks.
- Data acquisition and Control networks, such as DeviceNet, CANopen, ModBus, VLXI, VME, IEEE 1394, and IEEE 488
- Process automation robotics
- Telephony-based networks, including analog and digital cellular networks
- Consumer appliances (e.g., cell phones, audio-visual equipment, information kiosks)
- Dedicated infrastructure components (e.g. PBX's, automated dialers)

One aspect that distinguishes a non-traditional network is that it does not have either an SNMP (or other TCP/IP management stack), an SNMP OID-based management data hierarchy, or other aspects required for "traditional" network management functions to operate.

An "enterprise database" often contains information of use to the management of the enterprise as a whole, of which the technology components of traditional and non-traditional networks are a part. For example, these databases can contain information ranging from contact information, corporation organization, cost structures, pricing models, and other information related to the operation of the business. In exemplary use, the integration of these enterprise databases substantially improves the management efficiency by providing a single location from which the management system can obtain information. Some exemplary enterprise databases include commercial databases, such as sold commercially by Oracle (Redwood City, Calif.), IBM (Armonk, N.Y.), and Microsoft (Redmond, Wash.)); the underlying databases supporting customer relationship management (CRM) systems, and enterprise management applications (e.g. such as sold commercially by PeopleSoft and SAP), and other enterprise information stores such as Active Directory, LDAP, and associated directory information.

The management device further supports additional interfaces, and additional filtering methods for those interfaces. Additional interfaces include information publishing interfaces such as RSS and SOAP query interfaces. Filtering can also be defined for these interfaces to limit the number, type or information content of items transmitted on the interface.

A management device further supports Robotic Control and Automation applications that monitor and control factory floor automation robots. Typically, these devices are implemented using a stock control application, parameterized with one or more control specifications. The control specifications can vary depending upon the application and part being manufactured, or the robotic system can perform a single set of repetitive motions. Motion and position sensing of robotic systems is easily performed by the management device, as is robotic device alignment, calibration, and testing. Different dynamic applications are used to manage the robotic device in a production environment, from the dynamic applications used to align, calibrate, or test the robotics to those which control it or download control programs to it, to those that monitor its status and report out of tolerance conditions. The management device's combination of Maintenance Scheduler and robotic device alignment, calibration, and testing dynamic applications permit the quick implementation of periodic automated test and calibration regimens required for optimal performance of the system.

Exemplary System Architecture

FIG. 1 illustrates a network (1000) in accordance with the technology described herein by way of non-limiting example as will be appreciated by one having skill in the art. Network 1000 includes one or more devices in communication, including a personal computer (1010), a mainframe computer (1015) a printer (1020), an enterprise database server (1025), and a wireless device (1030). The devices are connected (i.e., in communication) with each other using any known technology, such as a ring network (1040), Ethernet (1045), and/or a wireless access point (1050). The exemplary illustrative network architecture described in FIG. 1 also includes other, independent networks (1060, 1060' [in this example, 1060 is a laboratory network based on the IEEE 488 standard]), each of which can include a plurality of devices, including at least one instance of a management device (1080, 1080) that is described in greater detail herein; various network apparatus including cables, switches, routers, and network servers (1065') and workstations (1065) that are indicated only generally; and a firewall or other security mechanism (1070, 1070'). Either network (or both) can comprise a remote version of a management device as described herein, or it may not include an instance of the management device at all (so long as at least one management device is instantiated on the network). The networks and other devices illustrated in FIG. 1 can communicate over a wide area network ("WAN," 1090) that can connect still other additional networks and devices (not shown) with the illustrated devices and networks as will be appreciated by those having skill in the art. Any network, or any sub network, are separated (i.e., made logically distinct) by additional network apparatus, including firewalls, routers, and the like, that do not explicitly pass management traffic. All physical components and devices described with respect to FIG. 1 are of standard construction and operate as understood by those of skill in the art.

In some example embodiments such as depicted in FIG. 1, an instance of a management device is virtualized using a commercial virtualization product such as VMWare (from EMC2, of Hopkinton Mass.). Management device 1080' is depicted in FIG. 1 hosted on a network server (1065'). Deployment of the management device as a network appliance, as part of a dedicated or shared server, or as one or more virtual devices does not affect the methods of operation described herein.

Each management device configuration provides a solution that updates and changes dynamically with the changes in the SCADA and SPC-based enterprise it manages. Unlike traditional SCADA and SPC-management based applications, each set of management devices is enterprise-centric; it manages the SCADA and SPC components within an enterprise as a whole. Unlike traditional networks, SCADA and SPC systems sometimes have limited network connectivity, often relying on proprietary protocols and controllers to access components of the SCADA and SPC network. In turn, this requires additional proprietary applications to store and manipulate the data from the SCADA and SPC networks. Often, these proprietary applications re-implement traditional network and process management functions. In other instances, SCADA and SPC systems share portions of enterprise networks and thus share the problems of these networks. Each management device provides mechanisms that integrate these disparate systems with traditional enterprise management systems.

For SCADA and SPC networks that have some TCP/IP connectivity, the management device integrates management of SCADA and SPC-accessible network applications and services, including traditional services such as e-mail (e.g. SMTP) and web (e.g. HTTP), newer service types such as SOAP-based web services, and vendor-specific data collection and reporting systems. Each management device further integrates log and event management for SCADA and SPC networks of systems, which enables logs and other information from multiple sources to be integrated and managed within the context of the enterprise; not the context of the independent server, application, or data source. For example, the error log for an industrial controller is integrated into the management device such that errors reported by the industrial controller are detected, acted upon by the management device, and reported to management as required by policy without the use of specialized systems to monitor the SCADA and SPC devices.

Each of these service types are managed not only for existence and availability, but instead are managed in accordance with enterprise-defined policies for configuration, hosting, availability, data collection, and quality-of-service features. This type of application and service management is not available in present day SCADA and SPC-management-based tools without extensive custom application development.

Each management device also defines and integrates management applications, for traditional management activities such as trouble tickets or asset management. In addition, each management device defines a large number of additional applications that are dynamically invoked when a new device or service is discovered on a SCADA or SPC network or host. Thus, if a new device or device controller is detected, the device or device controller have management applications dynamically instantiated. Similarly, if a device or device controller is configured to operate on a new lot or piece type, the management application used to configure and collect information from the device or device controller is dynamically instantiated and configured to match the requirements of the specific lot or piece type.

All of these activities are managed in accordance with management device policies, which define such diverse items as what types of servers and devices are permitted on the network, measurement tolerances, QoS parameters, and reporting mechanisms based upon discovered information, events, and service parameters. Policies are defined and enforced at any organizational level, such as enterprise, division, SCADA and SPC device network, or device.

The management device is designed to flexibly operate within enterprises both large and small, and upon SCADA and SPC networks that are connected using a variety of mechanisms. Traditional TCP/IP-based controllers, PC-connected or connections using gateway-style interface applications, and direct device control mechanisms are all supported using the same management device. The dynamic application(s) and templates interact with a collector on the management device to provide capabilities to interact with both traditional and non-traditional networks, either individually or in hybrid networks that combine both traditional- and non-traditional networks. For example, with non-traditional networks that are directly connected to a management device, dynamic applications can be used to discover information about the non-traditional network, such as devices attached to the non-traditional network. Once discovered, additional dynamic applications can be used to further discover and manage devices attached to, and aspects of, the non-traditional network. In an alternative example, where a management device is attached to a traditional network, to which a PC-connected, or another alternative computer-based gateway-style interface application is provided on a system also attached to the traditional network, the management device can use discovery and dynamic applications to discover information about the PC-connected or gateway-style interface application, and then use additional dynamic applications to further discover aspects of the non-traditional network attached to the PC-connected or gateway-style interface application. In this example, the gateway style interface application is an application that operates on a computer system distinct from the management device, and provides an interface to access the non-traditional network. Examples of gateway-style interface applications include protocol converter applications, control services that receive commands from a management system and translate these commands into actions on the non-traditional network, and other mechanisms well understood to those skilled in the art.

Once the non-traditional network is discovered, the network management device uses the techniques described herein to flexibly map aspects of the non-traditional network to managed network elements such as OIDs, or to create new managed OIDs for one or more aspects of the non-traditional network. The network management device is thus able to manage the aspects of the non-traditional network.

The flexibility, provided using a combination of templates and dynamic applications, either individually or in combination, permits the management device to recognize new systems, devices, and services that become present on the SCADA and SPC network or system, determine what applications, services, and information they provide, and then self-configure to manage these systems and applications and to collect information from each discovered SCADA and SPC devices. The self-configuration aspect of the management device greatly reduces the management overhead incurred when discovering new systems and devices, and permits dynamic extension of the management paradigm to newly discovered applications and systems without operator intervention. Similarly, the self-configuration aspect permits the management device to operate as an automated system for data collection and association of collected information with SCADA and SPC systems and devices as well as business objects such as those stored in enterprise databases such as particular parts, lots, orders, or other business or tracking entities.

The management device further integrates the management of traditional and non-traditional networks, and the devices they connect, with enterprise databases. Thus, the management device can integrate the management of a manufacturing device such as a gauge or CMM (including the collection of measurement data) with enterprise systems. In a first example, the management device can use part, lot, and order information in an enterprise database that is not normally part of the manufacturing process to govern part of the manufacturing process or to report upon the manufacturing process. For example, lot and order information is often stored in enterprise databases, and is associated with manufacturing production by exporting information from the enterprise database and loading said information into the manufacturing systems, such as by using order-based tolerance requirements to configure CMM devices. Similarly, manufacturing information, such as analytic information from the manufacturing process often must be manually exported from the manufacturing systems and then imported into enterprise databases to support order-based quality reporting, rather than being automatically collected from manufacturing systems and reported to enterprise databases.

A management device instance can further function as a security device, by accepting SCADA system logs, SNMP traps, e-mail notifications, and other electronic notification. These forms of information are collected by any management device instance, and the information can then be collected, correlated, and managed in the same manner as other network or service performance information. Specifically, this permits management device instances to be used with distributed or disparate SCADA systems.

The management device can support dynamic applications that collect RFID information from shop floor automation, and integrate the RFID-based information with other information collected in the management device data store. RFID scanners, such as those commercially available from Symbol Technologies, are TCP/IP or FieldBus attached systems that are managed using traditional management device management methods.

Each management device can further support management of one or more database instances as described herein. Management of database instances includes not only management of the database server and related server programs (as described in U.S. patent application Ser. No. 11/175,407), but has been extended to management of data stored within each database instance itself. Database tables are queried to determine specific values and information stored in the tables and the results of these queries are managed in the same manner as any other information collected by the system. For example, the management device can monitor an enterprise database for the status of lots being processed on a shop floor and generate an alert when a lot is not completed in a timely manner. The management device can further use this information to determine the reason that the lots are not completed in a timely manner.

In a more detailed example, the management device can detect the failure of a particular system or process device, and using the failure information, determine which specific lots are scheduled for use of the particular systems or process device and are now in danger of not being fulfilled in a timely manner, and the resulting cost implications of missing the delivery deadline. This level of integration unites the business processes with manufacturing processes to provide an integrated management system across both enterprise and production systems.

Similarly, the management device can make prioritization decisions based upon the relative costs of items that are being managed. For example, if an interface to a non-traditional network hosting measurement equipment has failed, and the measurement equipment can locally store measurement results for 4 hours of work, the prioritization assigned to the resulting trouble ticket is different than the prioritization assigned to a different failed interface to a furnace controller that requires updates every 10 minutes.

The management device is deployed stand-alone, or as part of a set of management device instances. Each management device instance can comprise one or more management device components as described in U.S. patent application Ser. No. 11/175,407 and further described below. A management device instance is preferably deployed as a stand-alone management device appliance, in which at least one management device component is deployed operating within a network appliance. Alternate deployments such as server software installed on extant servers have been contemplated, as have virtualized instances of the management device. Virtualization of the management devices is especially advantageous when it is necessary to place a "remote collector" behind a firewall or as part of an intermittently connected network where the capabilities of the "remote collector" are not sufficiently high as to require dedicated hardware. A virtualized "remote collector" shares the advantages of the network appliance model described in U.S. patent application Ser. No. 11/175,407, and provides further advantages of reduced cost and upkeep.

Multiple management device instances are logically combined in order to improve performance and availability of the management features provided by the management device(s). Each management device provides applications as described in U.S. patent application Ser. No. 11/175,407, with additional application functionality described herein.

The Alerting, Logging, and Escalation features that are provided by existing prior art network management devices that are also present in exemplary implementations of a management device of the exemplary illustrative non-limiting implementation have been omitted from this description. The use of a standardized, enterprise wide alerting, logging, and escalation mechanism provides significant economies of scale.

Collectors and interfaces are extended in the management device to include additional information collection mechanisms and interfaces. For example, interfaces that directly communicate with specific types of devices (such as a FieldBus) and databases are provided by the management device of the exemplary illustrative non-limiting implementation. These interfaces permit the direct access to systems and information accessed by non-traditional mechanisms, and to data stored in non-traditional data stores.

Figure 2:
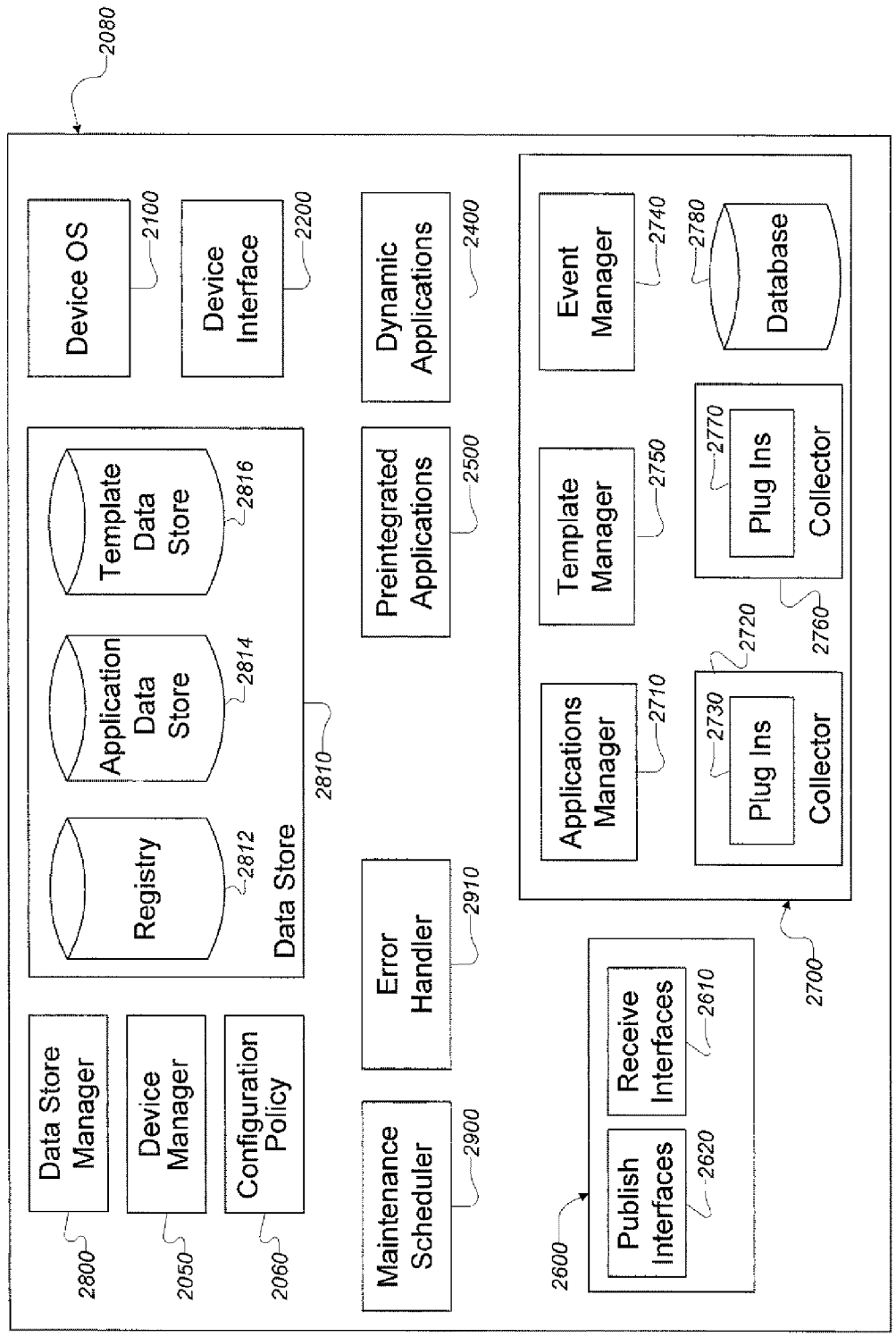
FIG. 2 depicts a schematic diagram of a management device in accordance with the illustrative technology herein.

The Publish (2620) and Receive (2610) interfaces of FIG. 2 are extended to support SOAP and other XML-based service oriented architecture (SOA) interface standards. The SOA interfaces permit the management device to interoperate with various reporting and enterprise information collection applications. The publish and receive interfaces are also extended to support additional mechanisms such as filtered RSS feeds, which provide an XML publishing scheme and an HTTP interface for integrating event details. In one example embodiment, the RSS feed is connected to a handheld user device (1030 of FIG. 1) or a network workstation or server (1065, 1065' of FIG. 1) using standard Internet protocols.

RSS feeds of managed events are used in several ways. First, an RSS feed is published by a network management device and subscribed to by a variety of user devices, applications, and systems. An aspect of an RSS feed is the RSS feed reader's ability to handle "re-publishing" of event information, and the user's ability to follow a link provided in an RSS feed to a web page in order to directly view the details surrounding an event. In an exemplary illustrative non-limiting implementation, an RSS feed of filtered events from a management device is constructed by creating a component with a management device event interface that accepts one or more events from a collector and publishes these events in the form of an RSS feed. The events are accepted by the interface, the data converted and formatted into RSS form, and the RSS feed(s) published. The URI, ordering, filtering criteria, and other aspects of the feed, are defined using one or more templates or other configuration materials. Specifically, the RSS feed interface publishes one or more RSS feeds at a URI determined by the template used to define the interfaces public address and the public address and format of each event published. Any field or information element in the management system is reported on, and is included in one or more aspects of the RSS feed. An example RSS feed is depicted below:

```
<title>Critical Events </title>
<description>Critical events provided by management device
</description>
<link>http://sciencelogic.com/em7/rss</link>
<item>
<title>Router down </title>
<description>Router 1234 is down since 01/01/2007 14:30 </description>
<link>http://sciencelogic.com/em7/index.php?event=123456 </link>
</item>
<item>
<title>Database free space decreasing </title>
<description>Database enterprise@databaseserver has 100M free space.
Policy indicates 250M min free space</description>
<link>http://sciencelogic.com/em7/index.php?event=123456 </link>
</item>
```

The RSS interface can construct description and other elements of the RSS feed using information stored in an event, in various templates, or in other locations in the system. For example, the "Router down" event item depicted above has the network device name ("1234"), and the date/time that the network management device discovered it was not responding properly (Jan. 1, 2007 14:30) merged into the description line of the RSS item. Similarly, the database event item depicted above has the device ID, and information from both a policy template (250M min free space) and collected information about the device (100M free now) merged into the description. Other information, including information stored in enterprise databases is added to an output feed.

One aspect of the output interface is that it provides application and user defined filtering of events based upon a template containing filtering criteria associated with an individual user's profile. Thus, a first user can receive a customized RSS feed comprising only those events that are of severity "critical", while another user can receive an RSS feed comprising only those events for which no action has been taken in the past 4 hours.

The RSS feed interface can merge a plurality of feeds into a single feed based upon a user's configuration.

An aspect of QoS measurement in management devices connected to non-traditional networks and enterprise databases include variance measuring and reporting, including measurement and production variance control and process monitoring functions. The QoS facilities of the management device are used to manage these aspects of SCADA and SPC devices.

Continuing with the examples described above, each management device is able to integrate escalation processes for system failures both on and off a production floor. Today, in many cases, IT and production resources are required to troubleshoot process equipment failures because the process equipment relies on one or more IT-based networks, and the business processes rely on the process equipment. For example, a failure of a machine lathe can be a mechanical problem such as a broken motor, or the problem can be that the network interface by which milling instructions are downloaded into the lathe is broken. Until the introduction of the management device, management of IT and process equipment has traditionally been handled manually or in different automated systems. The management device described herein integrates this management effort with integrated trouble ticketing, automated diagnostics, alerting, and escalation procedures.

Similarly, expensive systems are developed to manage automated calibration and testing, both within a production facility and to the customers of that facility. For example, a steel mill is required to take production samples of the steel produced on a lot-by-lot basis, analyze these samples, and adjust the production process in order to produce the desired steel composition. Furthermore, the mill is required to report these production test results to the purchaser of the steel. This information is tracked on a lot-by-lot basis, and is often manually loaded from the production system to the management systems. Sometimes, entire lots of steel are scrapped or reassigned when the production values fall outside of required or desired parameters. Systems are not available to determine whether it is cheaper to adjust the composition of the current batch of steel to the desired production values, or if it would be more cost effective to reallocate the current batch to a different project and produce a new batch that more nearly meets the production requirements. This entire process is traditionally handled by a collection of systems on a manual basis, with limited data integration between the laboratory system (on an IEEE 488 bus), the production system (a set of PLCs on a FieldBus network), and the enterprise order systems (in an Oracle database). Furthermore, monitoring, alerting, and related mechanisms are handled manually or by dedicated systems. The management device described herein automates these tasks by integrating management tasks across traditional and non-traditional networks enabling the monitoring and integration of production devices, lab equipment, and business information systems and providing a common platform for exception detection, alerting, and escalation management.

Policies and Templates

A Data Element Definition template is used to specify that the Collector (FIG. 2, 2720) collects information from a non-SNMP-aware device. This type of specification is an exemplary, illustrative, non-limiting implementation of a Data Element Definition template that is described more generally in U.S. patent application Ser. No. 11/175,407. The template specifies that the Collector collects SCADA and SPC information from a SCADA device. This type of specification is named using a Data Element Definition Template as described above, and is exemplified below:

Example SCADA element types
FieldBus network type
FieldBus adapter card type
FieldBus node address
Switch setting (read/write)
Sense register (read/write)—single bit sense value (on/off)

Meter register (read/write)—word sense value (value in range of 0-N)

Some uses of templates require the specification of partial results and patterns that are used by applications to match against information collected. This is particularly the case for elements such as a Data Element Definition Template or a Template Reference specification.

Optional association with known managed elements, such as associating a sense value with an Object Identifier (OID) or data element can also be defined in the Data Element Definition. Using the example, the data elements specified for collection might look like the one depicted below. Note that an optional association to an OID can also be specified in the Data Definition Element:

```
<CAN ip=1.2.3.4 busAdapter="CAN0" NodeAddress=0 OID=1.3.5.7.9>
    </CAN>
```

The resulting data collected by the Collector (as optionally associated with an OID) might be represented in an exemplary, illustrative, non-limiting implementation of a Data Storage Definition Template fragment as depicted below, which is exemplary in nature and has additional materials removed for clarity.

```
<COLLECTOR id=....>
    <DEVICE ip=1.2.3.4 busAdapter="CAN0" NodeAddress=0>
        <DATA>
            <OID id=1.3.5.7.9>123</OID>
        </DATA>
    </DEVICE>
</COLLECTOR>
```

A Classification Signature Template defines information used by the management device. Classification Signature Templates are extended to include SCADA and SPC information, as are Points of Management templates. Extension of these templates is understood by those skilled in the art.

Relatedness and requirements templates can also define a business need, such as a business requirement for redundant database servers to serve a web server farm. The Management device can not only detect when a database server is no longer providing database services, for example, using a QoS dynamic application, and notify the quality manager to take corrective action, but it can detect when values within the database have exceeded expected or desired limits. The redundancy management aspects of the management server are especially important when managing SCADA and SPC networks and devices, as the data and process information collected from these networks and devices is often critical to the operation of infrastructure or to contractual commitments for piece management. The dynamic corrective action capabilities of the management device permit simplified SCADA and SPC network and device architectures, resulting in simplified custom coding and reduced operating costs.

Relatedness and requirements template fragments define the relationship between servers, services, and applications (and subcomponents of each of these) by uniquely identifying the server, service, or application using a point of management template, and specifying the relationship (e.g. required, copy, depends upon) to another point-of-management template. Cascading failures of SCADA networks are identified by following the relatedness template references, and root causes of SCADA and SPC system problems are quickly identified.

A Content Parsing Template contains information used in the parsing of received information during the rendering of events. The Content Parsing Template can contain a regular expression, such as those used by common utilities such as grep, or it can contain more complex parsing instructions such as those found in an XSLT template. Content Parsing Templates have additional uses within management devices operating as part of SCADA and SPC systems. In a first use, an RTU or other SCADA or SPC system can provide a web interface for monitoring the device. In these cases, a management device can collect information from the SCADA or SPC device using a "screen scraping" mechanism in which the web page is fetched from the SCADA or SPC device, then parsed in the collector using a Content Parsing Template, and the SCADA or SPC control system information extracted for further processing.

In a second exemplary usage, many CMM devices provide their output in flat or structured file outputs. The Content Parsing Template is used in conjunction with an appropriate dynamic application to obtain and parse these output files, making the information collected by the CMM device available to the management device.

In a third exemplary usage, a Content Parsing Template is used to define mask-processing approaches. Some RTU and PLC devices output their information as a string of characters that are positionally processed. The Content Parsing Template provides a flexible mechanism for defining how these character strings should be processed by a management device's dynamic application.

Each SCADA or SPC device is further defined using "templates" as described above to identify names, sense, and configuration information about low level controllers such as PLCs, bus controllers, and data acquisition devices. For example, a template can define the ports and sense values available on a commercial data acquisition interface card such as those provided by IODATA corporation, and another template is used to map these ports and sense values to data collection values and specific dynamic applications that can collect, monitor, and store information available at the data acquisition interface card. Most interface cards today include sufficient information to identify their manufacturer and model number, allowing a management device to bootstrap the necessary management device dynamic applications to effectively manage, monitor, and collect data from the data acquisition interface.

Similar capabilities are provided for non-TCP/IP based networks, such as data collection networks provided using a non-TCP/IP based bus such as the DeviceNet, CANopen, ModBus, and IEEE 488. These networks are called non-traditional networks to distinguish them from TCP/IP-based networks. Each network device on these alternate types of networks has a unique address, and provides specific information in response to requests. A management device can use information about the non-traditional network interface to bootstrap a discovery application that communicates with the non-traditional network, and then subsequently interrogates or monitors the alternate network for information about devices on the alternate network. The management device can then use the newly collected information to further bootstrap additional dynamic applications to monitor and collect information from the devices deployed on the alternate network. In some exemplary illustrative non-limiting implementations, the system comprising the interface controller can have management device software installed on it. In other exemplary implementations, the system comprising the interface controller is accessible to a management device over a traditional TCP/IP link. In still other non-limiting implementations, the system comprising the interface controller is accessible only by a management device remote controller, either directly or indirectly as described above.

Exemplary Management Device

In one exemplary, illustrative, non-limiting implementation of the technology described herein, the management device is a network appliance. However, those having skill in the art will recognize that other, equally functional, implementations can include the management device running as an application on a server or workstation device. In at least one aspect of the exemplary illustrative non-limiting implementation, the management device (1080) is operably connected to one or more remote management devices (e.g. 1080') using a remote gateway component. Either instance of the management device (e.g. 1080 or 1080') is virtualized as described above.

One exemplary, illustrative, non-limiting implementation of a management device (e.g., 1080, 1080') is described in greater detail in FIG. 2. As depicted, the management device (2080) comprises a variety of component parts, each handling one or more aspects of the management device's functionality. As will be apparent to those skilled in the art, the apportionment of aspects of functionality to the specific components depicted is only one possible exemplary implementation, and other arrangements and divisions are possible without loss of functionality. The components depicted include: an operating system (2100), device interface (2200), data store manager (2800), device manager (2050), configuration policy (2060), maintenance scheduler (2900), error handler (2910), preintegrated applications (2500), dynamic applications (2400), interfaces (2600), a data store (2810), and a recognizer (2700). The interfaces (2600) further comprise publish interfaces (2620) and receive interfaces (2610). The data store (2810) further comprises a registry (2812), an application data store (2814) and template data store (2816). The recognizer (2700) further comprises an applications manager (2710), template manager (2750), event manager (2740), a database (2780) and one or more collectors (2720, 2760). Collectors further comprise zero or more plug-ins (2730, 2770).

The collector component (2720, 2760) is depicted in greater detail in FIG. 3, as described below.

Operating System

As illustrated in FIG. 2, the management device includes a device operating system (2100), of standard construction known to those having skill in the art, such as, for example and without limitation, the WINDOWS operating system available from Microsoft Corporation (Redmond, Wash.), UNIX, LINUX, or MAC/OS (Apple Computer, Cupertino, Calif.), and persistent computer readable storage for storing programs and data, for example, and without limitation, a hard disk, RAM memory, flash memory, etc. Still other devices do not have an operating system per se, but instead provide an environment for executing coded instructions or interpreted programs (e.g., Java programs). In such cases, the execution environment is considered to be acting as the operating system. The management device also includes at least one device interface (2200) that provides a mechanism for converting data to signals compatible with one or more devices on the network. The device interface can include interfaces to alternate network topologies such as IEEE 488 or CANbus. The device interface can implement wired- or wireless communications protocols. A non-limiting example of a wired communications protocol is TCP/IP, operating over Ethernet. A non-limiting example of a wireless protocol is TCP/IP operating over 802.11 g. In one exemplary, illustrative, non-limiting implementation, the selection and management of the device interface is made under the control of the device operating system. Each management device available on the network is constructed with one or more communications interfaces that enable the management device to simultaneously or sequentially communicate on multiple networks.

Pre-Integrated Applications

In addition to the embedded applications, the management device supports numerous pre-integrated applications (2500), examples of which include DNS, DHCP, Trouble ticket management, Asset manager, License manager, Log manager, and Failure manager as described in U.S. patent application Ser. No. 11/175,407. The pre-integrated applications support the expanded scope of the management system using the extended network address or data address in place of a TCP/IP address, and have additional functions as described herein.

Trouble Ticket Manager

The Trouble Ticket Manager is a pre-integrated application (2500) that provides trouble ticket tracking in association with other management device applications. It is pre-integrated with the management device application so that events, log messages, and various dynamic applications can create trouble tickets as part of the set of permitted applications. This functionality reduces the management overhead of a management device compared to other non-integrated applications.

The trouble ticket manager is extended with additional information collected by the collector plug-ins (2730, 2770), allowing trouble tickets to be created, dispatched, and processed using additional information. For example, a trouble ticket is created if a SCADA-defined process moves outside its statistical control points, or when there is a change in various database elements within databases and datasets monitored by the system.

Asset Manager

The management device Asset Manager is a pre-integrated application (2500) that provides a user interface and management for one or more data stores containing Asset information. Asset information includes device, service, and application information collected from the network. The management device Asset Manager can manage multiple data stores, and links between specific asset records in specific data stores.

The Asset Manager associates devices, applications, and services discovered during auto-discovery processes and maintains lists of known devices interfaced with, and software installed and/or running on a specific device. The inventory information is updated each time the device is processed, and differences in configuration can instantiate events that require operator intervention. SCADA and SPC networks can have a plurality of other devices present on them, and the asset manager can use a remote gateway component (3060) or a remote network DB gateway component (3090) to interface to and obtain information from these non-traditional networks. A management device can manage the configurations of devices under management by taking the applications and system configurations identified on the device by a discovery application, and comparing the identified information with one or more templates that specify required or desired configurations. Such configurations are specified as a series of points-of-management. The Asset Manager permits authorized operators to create configuration policies that are applied to devices, classes of devices, applications, or services to enforce configuration management.

The Asset Manager also associates and manages the association between extended network addresses and/or data addresses and asset fields maintained within the Asset Manager. Using a Data Element Definition template fragment and the Data Storage Definition defined for the application, the Asset Manager supports the association between a device's or database's monitored elements and one or more fields associated with an asset record. This technique permits an arbitrary device and/or database's monitored elements to be associated with all devices of a specific class, and to promote the visibility of these attributes to the asset manager user interface.

A management device can thus use its template capability to define desired or required system configurations, and to optionally define undesirable system configurations or vulnerabilities, and to take actions to mitigate network and system configuration defects or vulnerabilities based upon the information discovered. For example, an automated tolerance measuring device (e.g. a gauge) is installed on a factory floor network and connected to a factory floor CANbus. Once discovered by an appropriate collector, the gauge is entered into the asset database and the control tolerances, control software, dynamic applications, and operating policies are associated with the gauge (or class of gauges) using one or more templates. The Asset Manager of U.S. patent application Ser. No. 11/175,407 is extended to manage additional asset classes and configurations of assets.

The Asset Manager also associates and manages the links between a device's unique ID and asset fields maintained within the Asset Manager. Using the Data Collection template fragment and the Data Storage Definition defined for the application, the Asset Manager supports the dynamic link between a device's unique ID and a field associated with an asset record. This technique permits arbitrary device ID's calculated from device attributes to be associated with all devices of a specific class, and to promote the visibility of these attributes to the asset manager user interface.

In some exemplary implementations, the Asset Manager also stores and manages A&A materials for various devices and services that can be discovered. Storage of A&A materials is preferably performed using "secure" techniques, such as storing hashed password values and/or encrypting the A&A materials within the Asset Manager. Alternatively, no security techniques are used to protect the A&A materials. These A&A materials and the associations to specific devices, services, device types, service types, and/or other entities, as well as access restrictions concerning user access for modification, viewing, or deletion of particular A&A materials, are maintained by the Asset Manager, and accessed through the User Interface. A&A materials are provided to dynamic applications as required, in the form of templates and/or application parameters.

Dynamic Applications

The management device supports a set of dynamic applications (2400). These applications provide the management device with the capability to interact with specific types of devices or servers. They can function as a discovery application, a QoS application, and/or a specialty dynamic application that can configure a specific type of network appliance. Network devices envisioned include routers, switches, and firewalls, although the concept can be used with any type of network-connected device that offers a management interface. PLC's and other process control systems that provide management interfaces on an HTTP (Web) interface are straightforwardly managed. In this manner the dynamic application need only collect and parse the web page returned to obtain the desired information.

The management device supports a set of management dynamic applications. These applications provide the management device with the capability to interact with specific types of devices. They can function as a discovery application, a QoS application, and a specialty dynamic application that can configure, manage, or collect data from a specific type of device. Devices envisioned include RTUs, network attached PC-based controllers, CMM devices (e.g. gauges), PLCs, and other related devices.

For example, an RTU that controls a process valve can provide read/write access to the valve setting. The RTU reports the valve % of open setting when a specific RTU attribute is "read," and sets the value to the desired % of open setting when a specific RTU attribute is "written". A dynamic application that directly manages the RTU is developed. Alternatively, the RTU is managed by a generic dynamic application for data collection, and an additional control application is used to control the opening and closing of the valve. The dynamic application can store the valve settings to a data store, where they are used by other dynamic applications, or are made available to SPC monitoring applications in real-time. The mapping between the dynamic application and the underlying data store is provided using the standard management device data mapping mechanisms.

Dynamic applications can define functionality that includes:

Device management (such as SNMP management)
Log monitoring
Expert systems for interpreting detected information
Quality of Service (QoS) testing (and alerting)
Production value variance testing (and alerting)
Data logging and recording Dynamic applications are not restricted to SNMP management, but are constructed to use any desired management approach or protocol. Examples of alternate management protocols that are supported include SCPI.

Similarly, the management device can use a dynamic application to monitor specific devices for performance and compliance with established quality control standards. For example, a CMM can have specific tolerances within which a specific part must be measured. A dynamic application is used to manage and monitor a CMM on the network, and can further be used to monitor the values returned by the CMM to ensure that these values remain within tolerances.

Discovery applications provide an interface that supports interrogating a network device or service to collect additional information about that device or service. They take as input information that describes the device or service they are to interrogate, and output a set of descriptive data about what was found. For example, a discovery application can be used to look for database servers, and return a list of network addresses that are connected to database servers, along with information about the type of database servers discovered (i.e. Oracle, MySQL, Sequel Server, etc.). This information permits the management device to instantiate appropriate applications for access and/or control, as specified by policy. In some implementations, discovery of a device or service results in a more specific discovery application being dynamically instantiated to investigate aspects of the discovered device or service. For example, discovery of a PLC controlling a gauge by a PLC discovery application can result in the instantiation of a gauge discovery application that determines the type of gauge, its range of measurement, and response to change time. This information is used to select an appropriate management application for the gauge, and the parameters to supply to this application instance, such as how frequently to check the gauge and at what reading an alarm event should be generated. An iterative auto-discovery process is repeated as many times, and to as great a degree of precision, as required to determine all relevant aspects of a device or service. In some exemplary implementations, an auto-discovery process is repeated periodically, intermittently, or by direction of an operator, such that new devices that are connected to a network, or new services provided by new or existing devices, are discovered automatically and the appropriate dynamic applications instantiated for monitoring and/or control of the new devices or services. For example, in some exemplary implementations, a network technician connects a new server to the network, and the server device as well as the services it provides is placed under management by a regularly scheduled auto-discovery. Alternatively, in some exemplary implementations, auto-discovery is not scheduled but is initiated as required by operator command. In still other exemplary implementations auto-discovery is performed on a regular or intermittent schedule and can be initiated at other times by operator command. In some exemplary implementations, auto-discovery is directed as to device types, addresses or address ranges, services, or other aspects of the network to perform auto-discovery on, using templates, policies, operator inputs, or other means as will be apparent to those of skill in the art.

In some exemplary implementations, discovery applications are redeployed as Collector plug-ins. In this role, their invocation is parameterized with the Points of Management they are to collect. This parameterization can take the form of an invocation specification, a data linkage specification, or is dynamically constructed by the invoking application (by dynamically building a data linkage specification and passing the dynamically constructed specification to the discovery application).

The non-traditional network (e.g. IEEE-488, VLXI, DeviceNet, CANopen, ModBus) discovery applications interrogate at least one non-traditional network or network interface for RTUs and other devices present on a non-traditional network. Based upon the device response strings, the non-traditional network discovery applications identify the devices present on non-traditional networks and provide the additional information for the Collector to identify the non-traditional network devices and instantiate the necessary management dynamic applications.

IEEE 488 bus discovery applications can interrogate an IEEE 488 bus by issuing a bus reset, followed by an identification query.

A management device is distributed with discovery and QoS applications (or it can download them on an as-needed basis). Preferably, the management device includes predefined associations between well-known network ports and discovery applications.

The following are examples of some dynamic applications:

Remote Collector Discovery

A remote collector discovery application discovers remote collectors of the network device, and optionally integrates the information provided by these devices. The remote collector discovery applications permit a remote collector to be deployed on a network and then be discovered and integrated automatically by a network management system.

MYSQL Discovery

The MySQL discovery application interrogates MySQL server(s) on well-known ports. Because MySQL is configured to respond on other ports, the discovery application optionally can interrogate ranges of ports, and identify the presence of MySQL through the pattern of response obtained. The MySQL discovery application checks for service operation and known security weaknesses. The MySQL discovery application is integrated with the MySQL QoS Discovery application, or they can share information obtained during the basic discovery mechanism.

SQL*NET Discovery

The SQL*NET discovery application interrogates SQL*NET server(s) on well-known ports. The SQL*NET discovery application checks for service operation and known security weaknesses. The SQL*NET discovery application is integrated with the SQL*NET QoS Discovery application, or they can share information obtained during the basic discovery mechanism.

Database Schema Discovery

The Database schema discovery application interrogates a database identified by a discovery application such as a MySQL discovery or SQL*Net discovery application. The database schema discovery application interrogates the newly discovered database, obtains its schema, maps the schema to points of management, and then manages the database information in accordance with policy.

The specific methods used to obtain schema information are database-specific. Some databases implement query commands that result in the entire schema being provided, while in others the schema must be determined through a series of commands, each of which returns part of the required information, such as a listing of databases, a listing of tables within a given database, or the fields making up a particular table.

Figure 4:
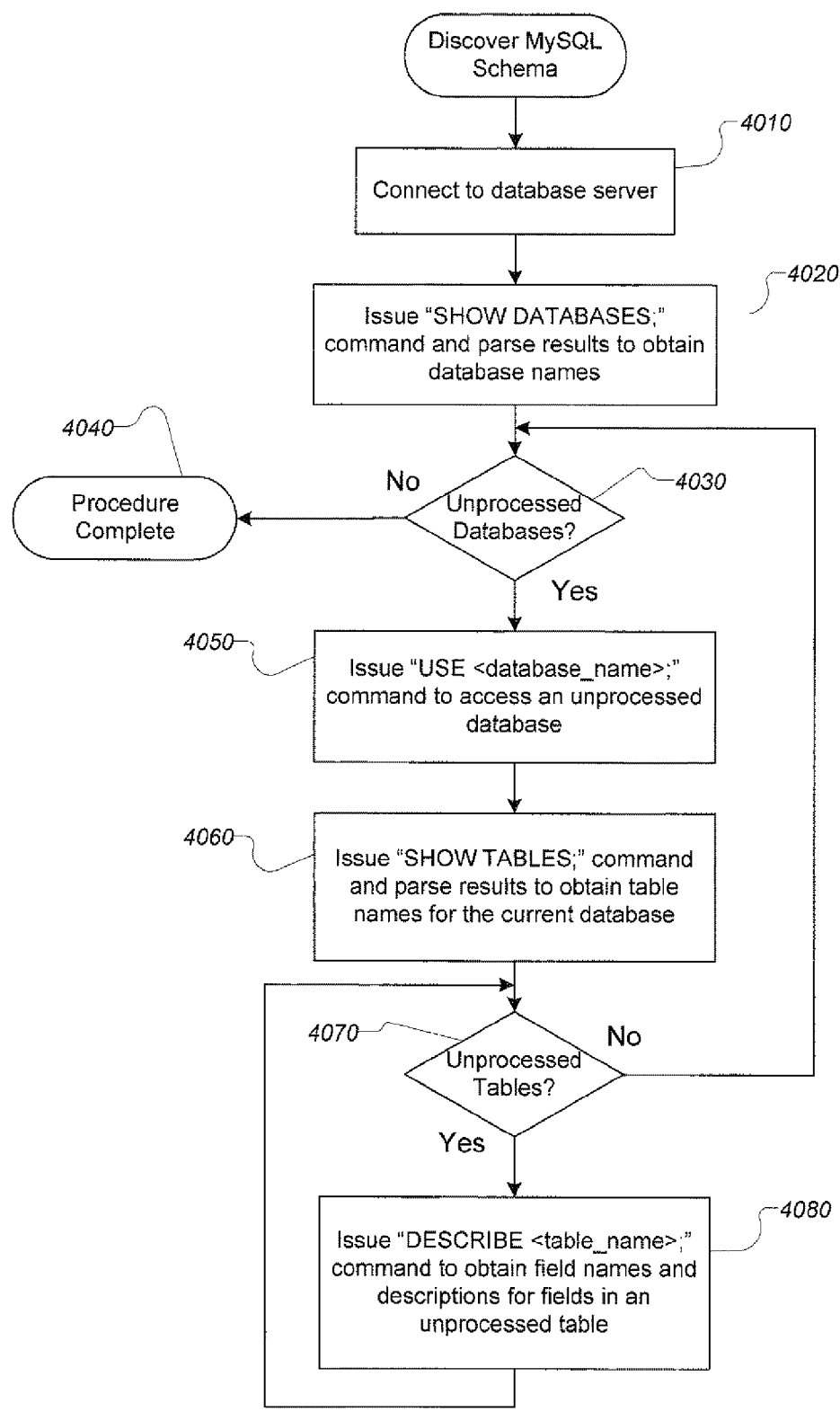
FIG. 4 depicts a process flowchart of an exemplary procedure for discovering the schemas of databases served by a MySQL database server.

For example, a MySQL database schema can be discovered by following the procedure described in FIG. 4. The schema discovery application first connects to the database server (4010), whether through an API or by creating a terminal session and issuing commands to a utility program, such as the mysql client. Use of A&A materials to authenticate the schema discovery application to the database server are not shown, as they are understood by those skilled in the art. The schema discovery application then issues a "SHOW DATABASES;" command (4020), which returns the names of the databases hosted by the server, and parses the results to obtain the names of the databases. If there are no databases hosted by the server (4030), the procedure is complete (4040), If there are databases hosted by the server (4030), the application selects one and issues a "USE <database_name>;" command (4050), where "<database_name>" is the name of the database as returned by the SHOW DATABASES;" command (4020). The "USE <database_name>;" command selects the named database and applies subsequent commands to it. The schema discovery application then issues a "SHOW TABLES;" command (4060), that returns a list of the tables in the selected database, and parses the returned information to determine the names of the database's tables. If there are no tables in the database (4070), the procedure moves on to the next unprocessed database (4030), if there is one, or terminates (4040) if there isn't another unprocessed database. If there are tables to be processed (4070), the discovery application selects one and issues a "DESCRIBE <table_name>;" command (4080), where "<table_name>" is the name of the unprocessed table, and parses the returned information to determine the fields making up the table, as well as information about each field, such as the type of data it contains. The discovery application then looks for another unprocessed table (4070), and repeats the "DESCRIBE" command (4080) for each. When there are no more unprocessed tables in the database (4070), the application looks for another unprocessed database (4030). If there are none, the process is complete (4040), and if there is, the "USE" and "SHOW TABLES" commands are used, as described above to process each of them.

The methods required for connecting to a database server, communicating commands to it, receiving responses from it, and parsing the responses to obtain required information are well known to those having skill in the art. The method of discovering database schemas for database systems other than MySQL are similar in nature, and are also well understood by those with skill in the art.

Points of management for databases are templates or template fragments that describe the databases, tables, and fields that are of interest. Descriptions are specific, with particular databases, tables and fields being specified by name, in which case the mapping of schema to points of management is obvious. Descriptions can also be less specific, such as using pattern specifications, for example, the regular expressions used by the UNIX grep utility or languages such as Perl, to specify the parts of the schema that make up the points of management. For example, a point of management can specify that all tables that include the string "CMM" in any field whose name contains the string "device," in a database called "production" is to be managed. Mapping schemas to points of management in such scenarios requires comparing the specified patterns to the discovered schema to create a list of schema entities that are to be managed.

Device Manager

The management device also includes a device manager application (2050) that, in one exemplary, illustrative, non-limiting implementation, is an application operating on the management device that lets an operator of the management device configure the management device for operation using a user interface. The device manager application can further include a component (not shown) that reads and writes at least part of the configuration policy (2060) using techniques that are well understood by those skilled in the art. The construction of the device manager is accomplished using methods well known to those having ordinary skill in the art.

Interfaces

Interfaces (2600) provide application service-level interfaces for publishing and receiving information in various standard formats. The interface applications provide input and output in well-known protocols. Interfaces include port/protocol specific interfaces (for TCP/IP), controller/node addresses for dedicated networks such as CANBus or FieldBus, database callout/callback for databases. The extensible interface mechanism is extended to any type of automated system that has a corresponding communications capability. Interfaces are Receive or Publish. Receive interfaces (2610) provides a mechanism for external systems to send information to the management device on an asynchronous basis. A Publish interfaces (2620) publishes information collected by the management device in a specified protocol/format.

Management device interfaces are applications, and thus are subject to standard management device controls over applications. The Configuration Policy defines the list of Interface applications that are started as part of the management device instance. These applications are started at boot, and kept up until the management device instance is reconfigured or shut down.

Previously defined receive interfaces (e.g. Log, SNMP, SMTP) as defined in U.S. patent application Ser. No. 11/175,407 continue to operate. The Log file interface for "flat files" is of increased importance, as many databases, SCADA, and SPC devices provide their outputs and logged information that must be read, parsed, and processed. The Log Receive interface can receive flat files, or can monitor flat files for changes, and then parse the files using template-based pattern matching as described in U.S. patent application Ser. No. 11/175,407. The receive interfaces are also extended using the dynamic application capabilities as described in U.S. patent application Ser. No. 11/175,407 to include additional interfaces, including database interfaces, trigger and callback interfaces, structured input interfaces, and a generalized RPC interface.

Additional structured information receive interfaces are also introduced, including RSS and XML receive interfaces. These interfaces receive structured data and convert it to management device formats suitable for discovery or status tracking uses or for logging and storage.

The database callback interface receives callbacks from one or more monitored databases, and can act in coordination with a database's callback mechanism. The database callback interface receives callbacks from a database, often from a stored procedure or trigger, and communicates with the database to cooperatively operate on information stored within the database. The callback interface can send or receive information with the connected database. Information received from the connected database is used by the management device to manage information stored in the connected database, other databases, or other devices managed by the management device.

The database callback interface is constructed to communicate with a single database, a single type of database (e.g. Oracle), or a multitude of databases using a common interface such as ODBC, JDBC, or other database isolation layer. Specifically, database interface components are envisioned for Oracle, Sybase, Postgress, MySQL, Microsoft SQLServer, and other common commercial or open source database systems.

The management device also supports a generalized RPC interface by which requests are submitted to the management device. Generalized RPC interfaces include traditional RPC interfaces such as Sun RPC, CORBA, and SOAP. These requests are serviced by the RPC interface itself, or they are associated with a fixed application, or are associated with a dynamic application.

Publish Interface

Publish interfaces (2620) have been extended to include database publishing mechanisms and additional alert delivery and display mechanisms. As described above, the extensible interface mechanism is extended to provide publishing interfaces to databases such as Oracle, Sybase, MySQL and SQLServer. Two types of database publish interfaces are envisioned, a first interface type that publishes collected information to a connected database, and a second interface type that is operable to publish collected information to a connected database and to further make stored procedure calls to the connected database on behalf of the management device.

Information that is published to an interface is added to the Template-Interface binding table. The interface application extracts rows from this table, selected by InterfaceID, and makes those templates available on the specified interface. The application program uses the "binding parameter" as a hint on how to bind the Template within the Interface.

Publish interfaces are also extended to permit non-traditional delivery of event and alert information. The publish interfaces have new interfaces such as RSS and SMS delivery mechanisms, to which selected alert and event information are sent. The filtered information is then provided to operators and managers. For example, an RSS publish interface is configured on the management device. The RSS publish interface receives specific events, alerts, and notifications from the management device, reformats the events, alerts, and notifications into RSS format, and publishes a feed in RSS format for subscription by end users. Each event, alert, and notification is converted to an RSS entry. The RSS summary text comprises information selected by template, and a link back to a web server provided by the management device. The user selects the link, and is presented with the complete event, alert, or notification.

Device ID

Machine (device) identities are assigned by a first party, which issues and binds the device key pair to a license key that is downloaded into the license manager. Alternatively, a management device is associated with a specific identity provider such as a SAML provider, and can use the external identity provider to manage machine and device identity. A presumed unique attribute of a distributed management device instance (e.g. an IP or MAC address) is used as a shorthand device ID over standard protocols. In some SCADA applications, a device ID does not have a single unique attribute and a composite unique attribute is used. For example, a SCADA device may not be directly accessible to a management device, instead being reachable as a specific controller card connected to a network attached PC. In other cases, an RTU or PLC is directly connected to an Ethernet and be addressable using standard TCP/IP addressing.

A management device's auto-discovery mechanism uses the Points of Management template as the vocabulary specification and a database of collection signatures that indicate the presence of a specific type or class of device. For example, a device signature can consist of the following Points of Management:

DeviceNet controller (IP+controller ID)+DeviceNet address+attribute definition.
An Ethernet adapter ID indicating manufacturer of the Ethernet card in an RTU or PLC.
A FieldBus controller (management device IP+controller ID+FieldBus node ID+attribute information).

Device management within the management device is similar to traditional SNMP management except that the elements to manage (and their definitions) are defined within an application specification template. In a first non-limiting example, templates are used to associate non-SNMP-based device and data with OID reporting structures. For example, a device is defined as a non-SNMP-aware device on CANbus "CAN0". The device has a set of sense registers at addresses 1, 2 and 3. The management device can map the bus and sense registers to an OID structure, thus converting the non-traditional device into a device that reports into an OID tree starting at a specific location (e.g. 1.3.5.7.12). The dynamic application can thus be defined to watch all collected information for a device that supports the 1.3.5.7.12 tree. The dynamic application in question would be able to further discover and manage information within the 1.3.5.7.12 OID tree.

Alternatively, device management for non-SNMP aware devices is defined using the controller/node ID of the device, paired with the data definition for the device specific sense interface. For example, a device that is hosted on a CANbus network is identified using any of a controller ID such as "CAN0," a CANbus address (e.g. 5), a specific data port (e.g. 0x3333, or "temperature sensor"), IP address, or any combination of these addresses. For example, a device name can be constructed using a UUCP-style concatenation as follows:

"1.2.3.4!CAN0!0!temperature sensor"

Managed devices and their data often must be matched to specific lots, products, or other production-centric mechanisms. This process is straightforward in a management device. Dynamic applications can specify one or more templates that are created and downloaded from production management systems. The template is associated with a collected datum in the collector or within a dynamic application. Each device datum is associated with business process specific information using one or more of these templates.

Embedded Applications

In one exemplary, illustrative, non-limiting implementation, the management device includes embedded applications (2700), which are a class of applications that operate on the management device. An embedded application is an application that is included with the instantiation of a management device. These applications provide a core framework within which the management device operates and can distribute information to other instances of the management device. In one exemplary, illustrative, non-limiting implementation, the list of embedded applications eligible to operate on a specific device instance are defined and controlled by the configuration policy (2060) as described above. In a more specific exemplary, illustrative, non-limiting implementation, an embedded application need not be present on a specific instance of the management device; the specific management device using the embedded application need only be aware of which instance of the management device the embedded application is operating on and how to call the embedded application on that management device.

In one exemplary, illustrative, non-limiting implementation, the embedded applications are instantiated using a process in which embedded applications are instantiated on a specific instance of the management device. When an embedded application is so enabled, an Instantiation Conditions Element is first evaluated and a determination is made as to whether the application can be instantiated. If so, then control is passed to the application manager (2710) to instantiate the application. Once an embedded application has been instantiated, it is automatically invoked at startup. It can also be invoked (if not already running) periodically using a time-based invocation. This invocation method is implemented by a Maintenance Scheduler (2900) that manages the polling frequency and invocation of the Template Manager to conduct polling activities as described in greater detail below.

The Collector

The Collector (2720, 2760) provides the service framework for interrogating network devices, applications, and services, and forwarding the collected information to Collector Plug-in web (2730, 2770). The Collector itself does not perform any recognition tasks; rather it provides the framework for the execution of Collector plug-ins (2730, 2770). The Collector provides the mechanism by which collected information is aggregated, managed, and passed to Collector Plug-ins for further processing. After the information has been collected, it is passed to a Recognizer for further processing. In this way, the Collector manages the data flow between Collector Plug-ins, other applications, and the data stores.

One common distributed approach is use a "remote collector" configuration, in which a low end appliance platform (or virtual machine) is placed on a SCADA or SPC network and the information it collects is forwarded back to a "master" management device as traditional network bandwidth is available. An example of this type of distributed deployment is more fully described below. A "SCADA collector" appliance has the management device collector component and a partial replication of some of the configuration information. It collects information about its remote network and reports the consolidated information back to one or more "master" management devices. This configuration reduces network bandwidth requirements between the SCADA and SPC devices and the controller software operating on a network, and permits the collection and monitoring processes to continue even if the network link between the management device master and SCADA collector is not available.

The Collector is implemented as an embedded application that enables the management device to perform information collection and processing tasks. Collector instances are distributed between the management device instances, and can use both local and non-local data stores. Expert system techniques, such as forward chaining (a data-driven technique used in constructing goals or reaching inferences derived from a set of facts), are especially advantageous in implementing Collectors, in that they operate on partial sets of discreet elements, and upon receipt of all necessary elements they trigger a rule. This rule can invoke an application or generate an event. For example, a Collector that uses a forward chaining expert system might transform a set of Invocation Specification templates of pre-integrated or dynamic applications for use as rules within a forward chaining expert system. When the conditions of an Invocation Specification are met, the expert system executes its rule that invokes the specified application or generates a specific event. Alternatively, a Collector is coded using more traditional methods, such that the set of defined Invocation specifications are inspected for each set of data elements received within the Collector.

Figure 3:
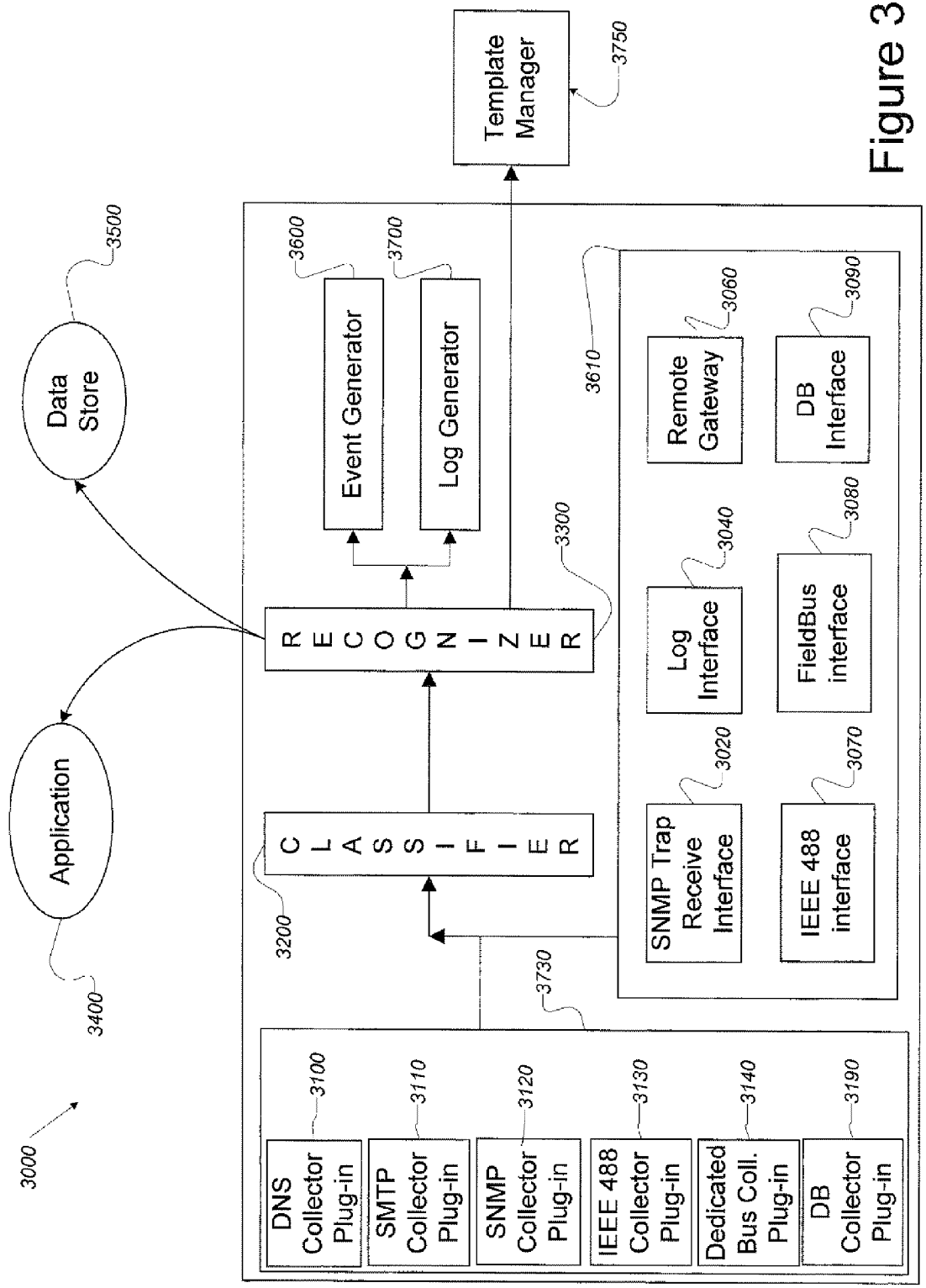
FIG. 3 is a schematic illustration of two exemplary types of Collector in accordance with the illustrative technology herein.

FIG. 3 is an illustrative diagram of a Collector and its components (3000). In the illustrated exemplary, illustrative, non-limiting implementation, the Collector includes data receiving interfaces (3610) that collect data sent from various network servers and devices having known formats. In the illustration, the data receiving interfaces include an SNMP Trap Receive Interface (3020), a Log Interface (3040), and a Remote Gateway (3060), IEEE 488 receive interface (3070), FieldBus interface (3080), database interface (3090), and other interfaces as required. However, additional interfaces will be apparent to those having ordinary skill in the art. In addition, the Collector (2720, 2760) includes various plug-ins (3730) that collect user-specified data from various devices on the network, such as IEEE 488 networks using an IEEE 488 management plug-in (3130), dedicated bus/network management plug-ins (3140), and database management plug-ins (3190), as well as protocol-specific plug-ins, such as DNS (3100), SMTP (3110), or SNMP (3120). Other plug-ins will be apparent to those having skill in the art. Each of the plug-ins is a dynamic application that is controlled using the application manager (2710), including discovery, QoS, and data collection applications as described herein.

Both interfaces (3610) and plug-ins (3730) forward their collected information to the Classifier (3200) having first conformed the data to the relevant data definition templates, so that the data received by the Classifier is already parsed and tagged for efficient matching with the specifications available in the Classifier using processes that will be apparent to those of ordinary skill in the art. The Classifier identifies (if possible) what data is needed for management. The identified data is forwarded to the Recognizer (3300). The Recognizer determines those processes needed to obtain the data (if possible), and then enacts those processes (if possible). Such processes can include passing data to a previously instantiated application and instantiating new applications (3400), moving data to storage (3500), including, e.g., one or more instances of data store (2810), passing data to the event generator (3600) to cause the downstream generation of an event (e.g., a system alert), creating a log entry (3700), or formatting the data in accordance with a forensics template and passing that data to the template manager (3750) for processing as described herein.

For example, management device instances that use Collectors configured for remote operation can have read-only cached copies of the Classification Signature and Data Element Definition templates and slave copies of the data stores into which the Collector and its plug-ins write information. This permits the remote Collector to operate without direct connection to a master management device(s) and to synchronize the information collected as needed without involvement of the application. This capability substantially reduces the complexity of the applications and permits greater flexibility in the deployment of the management device technologies.

In an alternative example, management device instances that use Collectors configured for remote operation can use a plug-in that transmits collected information to a Collector operating within a disparate management device. The Remote Gateway (3060) on the disparate management device receives this information and submits it to the Collector on the disparate management device for further processing.

Classifier

The Classifier is a special purpose application that matches the information collected from other Collector Plug-ins and determines which applications should be invoked in response to specific collected information. The Classifier is implemented as part of the Collector, or as a Collector plug-in. Implementing the Classifier as a Collector plug-in provides advantages in scalability and configuration flexibility. Multiple instances of the Classifier can be run, either within a single Collector instance, or within multiple Collector instances. The Configuration Policy defines this configuration option.

A Classifier is limited as to the type of information that it is capable of processing. This is referred to as the "type" of the Classifier. For example, specialized Classifiers are constructed that process:

Data acquisition devices
Data acquisition cards (e.g. an A/D card from IODATA)
Data bus interface devices, such as devices that interface to HB-IB or FieldBus networks such as DeviceNet, CANopen, or ModBus networks
Serial, parallel, or other I/O devices
IEEE 488 device outputs
VXLI device outputs Log records
E-mail messages
XML documents
SQL transactions
RSS Feeds
SNMP Traps
Maintenance Scheduler The Maintenance Scheduler manages schedules for people defined in a management device by defining their availability to accept notifications and reports. It is also used to define standard working hours. A person's schedule definition is used by management devices to limit their capabilities and/or interaction with the system. For example, a person may not be notified of an escalation if the escalation occurs outside their available time.

The Maintenance Scheduler for devices defines when a device is available and what, if any, maintenance windows are defined for the device. It also defines calibration schedules for devices that require periodic calibration or self-test. Integration of calibration and self-test functions within a common management framework eliminates a redundant operation where a plurality of users can have separately managed actions on a specific device. Each device's schedule can also be used to define allowable polling or interaction windows.

In some exemplary implementations, the Maintenance Scheduler is combined with dynamic applications for specific device control to permit automatic periodic calibration checks when devices support such functions. This capability supports DMAIC efforts by enabling better monitoring of device function, and control over device accuracy. In devices where calibration operations communicate the amount of correction applied, the management device's dynamic applications used to monitor and control the device can track corrections over time and calculate a "drift factor" that describes how rapidly a device loses calibration, and so optimize the frequency of calibration operations so as to maximize productive time while keeping the device within required accuracy parameters.

The management device's enterprise system interaction capabilities permit decisions about device management to be made based in part, or in whole, on customer requirements or other business factors. For example, if calibrating a given device results in closer adherence to manufacturing tolerances, but the time required for the calibration operation slows production rates, too frequent calibration results in reduced output and perhaps reduced profits. On the other hand, not adhering to required tolerances can result in wastage and customer rejection of products. Customers requiring tight adherence to tolerances can specify this in their order, and the order enterprise system can be queried to determine the required tolerances for a given batch of production and the calibration application run at a frequency that achieves the required tolerances. When customers specify looser tolerance limits, they can be charged less, the calibration run less frequently and the production rates maximized so as to maintain profit levels while providing competitive costs for customers without tight tolerance needs. Without the ability to automatically connect enterprise business systems to device management systems, any cost savings can be lost by the work required to manually convey this information to the production environment.

What is claimed:

1. A method of discovering and interoperating with devices connected to a computer network, the method comprising:
    discovering at least one device connected to the network;
    identifying said discovered device;
    in response to said discovering and identifying, instantiating and invoking an instance of a dynamic application on a further device also connected to the network, said dynamic application being first instantiated and invoked on the further device in response to discovery and identification of said discovered device on the network;
    using the dynamic application instantiated and invoked on the further device to perform further discovery of said discovered device over the network without requiring the discovered device to execute a discovery software agent; and
    receiving, over the network, information relating to said further discovery from said instantiated and invoked dynamic application.

2. The method of claim 1, further including the steps of:
    evaluating said discovery information;
    accessing a template store;
    matching a template in the template store against said received discovery information; and
    instantiating a further dynamic application at least in part in response to information derived from the template matching.

3. The method of claim 1, further including instantiating subsequent dynamic applications on the further device in response to discovery information received from a previously instantiated dynamic application until a determination is made that substantially all discoverable aspects of said discovered device have been discovered, thereby placing said discoverable aspects of the discovered device under management.

4. The method of claim 1, further including determining that said discovered device is a database server;
    determining the schema of said database from said received discovery information; and
    determining substantially all aspects of said database that require monitoring or control.

5. The method of claim 1, wherein:
    the dynamic application is configured to identify a fingerprint of type of said discovered device, and,
    said performing further discovery includes determining the specific capabilities of said discovered device based upon the fingerprint, selecting a further dynamic application from a set of possible dynamic applications based at least in part upon the fingerprint or the determined capabilities, and instantiating at least one dynamic application configured to manage said discovered device.

6. The method of claim 1, further including the steps of:
    accessing a store of previously stored authentication and authorization materials, and
    using said authentication and authorization materials in conjunction with an auto-discovery dynamic application to access the discovered device.

7. The method of claim 6, wherein said authentication and authorization materials enable access to a database on the discovered device.

8. The method of claim 6, further including providing at least some access to those with less than full access authorization.

9. The method of claim 6, wherein:
    each of said authentication and authorization materials provides differential access to said discovered device and/or services provided by the discovered device;
    performing auto-discovery using a plurality of said authentication and authorization materials to obtain two or more sets of discovery results, each set of discovery results corresponding to a particular set of authentication and authorization materials;
    identifying variations among said discovery results;
    accessing a stored template-based device description; and categorizing and classifying said discovered device based at least in part upon the variations among discovery results and the template-based device description.

10. The method of claim 9, further including determining at least one device personality.

11. The method of claim 10, wherein said device has at least two personalities, and each personality of said device is managed independently.

12. A system for discovering devices on a network, comprising at least one processing device connected to the network, the processing device being structured to provide a discovery mechanism configured to discover at least one device on said network, said discovery mechanism being configured to:
- Identify, over the network, a discovered device,
- in response to said discovery and identification, instantiate and invoke a dynamic application on the processing device, said dynamic application being neither instantiated nor invoked until said discovery discovers a need for said dynamic application;
- use the instantiated and invoked dynamic application to perform further discovery of said discovered device over the network without requiring the discovered device to execute a discovery software agent; and
- receive, over the network, information obtained from said further discovery from said dynamic application.

13. The system of claim 12, further including:
a mechanism for evaluating said discovery information wherein said discovery mechanism is configured to instantiate a further dynamic application in response to said evaluation.

14. The system of claim 13, wherein said discovery mechanism is configured to instantiate subsequent dynamic applications in response to discovery information received from previously instantiated dynamic applications until a determination is made that substantially all discoverable aspects of said discovered device have been discovered.

15. The system of claim 12, wherein the dynamic application is configured to identify a fingerprint of type of said device based upon at least one of (a) the firmware load and (b) the revision level of said device.

16. The system of claim 12, wherein said discovery mechanism further includes authentication and authorization materials.

17. The system of claim 16, wherein said authentication and authorization materials enable access to a database.

18. The system of claim 16, wherein said authentication and authorization materials are stored and managed in an Asset Manager.

19. The system of claim 12, wherein said device is managed as a single point of management with a plurality of behaviors, each of said behaviors being associated with authentication and authorization materials.

20. An iterative method for interoperating with at least one network device comprising:
- dynamically discovering, across a network, at least one characteristic of a device connected to the network;
- at least in response to said discovering, instantiating and invoking an instance of a dynamic application that at least in part interoperates with said device;
- further dynamically discovering, across the network with the dynamic application, at least one further characteristic of said device without requiring the discovered device to execute a discovery software agent; and
- at least in part in response to said further dynamic discovering, running the same or different dynamic application to further interoperate with said device.

* * * * *